(12) United States Patent
Hannemann et al.

(10) Patent No.: US 9,108,864 B2
(45) Date of Patent: *Aug. 18, 2015

(54) CONSTRUCTION SITE WATER TREATMENT SYSTEM AND METHODS

(75) Inventors: William Robert Hannemann, Ocean Gate, NJ (US); Albert Mayer Cohen, West Long Branch, NJ (US); James Creech, Freehold, NJ (US); Michael Hannemann, Toms River, NJ (US)

(73) Assignee: Storm Drain Technologies, LLC, Ocean, NJ (US)

( * ) Notice: Subject to any disclaimer, the term of this patent is extended or adjusted under 35 U.S.C. 154(b) by 269 days.

This patent is subject to a terminal disclaimer.

(21) Appl. No.: 13/605,824

(22) Filed: Sep. 6, 2012

(65) Prior Publication Data

US 2013/0068699 A1 Mar. 21, 2013

Related U.S. Application Data

(63) Continuation-in-part of application No. 13/234,019, filed on Sep. 15, 2011, now Pat. No. 8,889,000.

(51) Int. Cl.
*E03F 5/14* (2006.01)
*C02F 1/00* (2006.01)
(Continued)

(52) U.S. Cl.
CPC ............... *C02F 1/00* (2013.01); *B01D 21/003* (2013.01); *B01D 21/0003* (2013.01);
(Continued)

(58) Field of Classification Search
CPC .......... E03F 5/14; E03F 5/16; B01D 21/0003; B01D 21/0006; B01D 21/0012; B01D 21/003; B01D 21/0039; B01D 21/0075; B01D 21/2494; B01D 2221/08; B01D 2221/12; C02F 1/006; C02F 2001/007; C02F 2103/001; C02F 2201/008; C02F 2301/08; C02F 2303/24
USPC ......... 210/747.2, 801, 170.03, 241, 252, 253, 210/521, 532.1, 538, 540
See application file for complete search history.

(56) References Cited

U.S. PATENT DOCUMENTS 1,850,483 A * 3/1932 Umont ......................... 210/253
4,261,823 A 4/1981 Gallagher et al.
(Continued)

FOREIGN PATENT DOCUMENTS

EP 0820796 A2 1/1998
GB 2305617 A 4/1997

OTHER PUBLICATIONS

Patent Cooperation Treaty Written Opinion of the International Searching Authority for PCT/US2012/055665, Mar. 7, 2013, 6 pgs.
(Continued)

*Primary Examiner* — Christopher Upton
(74) *Attorney, Agent, or Firm* — Peter J. Meza; Theodore J. Mlynar; Hogan Lovells US LLP

(57) ABSTRACT

A portable fluid treatment apparatus includes a container with an interior wall between the inlet pipe and the outlet pipe which defines a bottom space between the bottom of the wall and the bottom interior surface of the container. A series of collectors in the container direct the flow of the inlet fluid and promote sedimentation from the fluid. The inlet fluid flows under the wall and up to a discharge pipe equipped with a vent. Multiple sedimentation units are connected together in series and mounted on a trailer for transport to a construction site.

15 Claims, 16 Drawing Sheets

(51) Int. Cl.
  *B01D 21/00* (2006.01)
  *E03F 5/16* (2006.01)
  *B01D 21/24* (2006.01)

(52) U.S. Cl.
  CPC ....... *B01D 21/0006* (2013.01); *B01D 21/0012* (2013.01); *B01D 21/0039* (2013.01); *B01D 21/245* (2013.01); *B01D 21/2405* (2013.01); *B01D 21/2483* (2013.01); *C02F 1/006* (2013.01); *E03F 5/14* (2013.01); *E03F 5/16* (2013.01); *B01D 21/0009* (2013.01); *B01D 21/0072* (2013.01); *B01D 21/0075* (2013.01); *B01D 21/2494* (2013.01); *B01D 2221/08* (2013.01); *B01D 2221/12* (2013.01); *C02F 2001/007* (2013.01); *C02F 2201/008* (2013.01); *C02F 2301/08* (2013.01)

(56) References Cited

U.S. PATENT DOCUMENTS

| | | | |
|---|---|---|---|
| 4,501,446 | A | 2/1985 | Glaser et al. |
| 4,994,179 | A | 2/1991 | Keeter et al. |
| 5,011,605 | A * | 4/1991 | Pape et al. ............. 210/253 |
| 5,322,629 | A | 6/1994 | Stewart |
| 5,342,523 | A * | 8/1994 | Kuwashima ............ 210/253 |
| 5,405,539 | A | 4/1995 | Schneider |
| 5,423,986 | A | 6/1995 | Valentin |
| 5,489,383 | A | 2/1996 | Yoshikawa |
| 5,505,860 | A | 4/1996 | Sager |
| 5,520,825 | A | 5/1996 | Rice |
| 5,730,878 | A | 3/1998 | Rice |
| 5,961,827 | A | 10/1999 | Bahr |
| 6,063,296 | A | 5/2000 | Ackerman et al. |
| 6,076,702 | A | 6/2000 | Hoffmann et al. |
| 6,120,684 | A | 9/2000 | Kistner et al. |
| 6,126,817 | A | 10/2000 | Duran et al. |
| 6,190,545 | B1 | 2/2001 | Williamson |
| 6,258,268 | B1 | 7/2001 | Lake |
| 6,270,663 | B1 | 8/2001 | Happel |
| 6,305,845 | B1 | 10/2001 | Navin |
| 6,350,374 | B1 | 2/2002 | Stever et al. |
| 6,379,547 | B1 | 4/2002 | Larsson |
| 6,401,983 | B1 | 6/2002 | McDonald et al. |
| 6,428,692 | B2 | 8/2002 | Happel |
| 6,547,962 | B2 | 4/2003 | Kistner et al. |
| 6,783,683 | B2 | 8/2004 | Collings |
| 6,869,525 | B1 | 3/2005 | Happel |
| 6,911,145 | B2 | 6/2005 | Hutchinson et al. |
| 6,936,163 | B2 | 8/2005 | Use et al. |
| 6,955,756 | B2 | 10/2005 | Fallon |
| 6,994,783 | B2 | 2/2006 | Use et al. |
| 7,001,514 | B1 | 2/2006 | Liao |
| 7,011,743 | B2 | 3/2006 | Use et al. |
| 7,022,243 | B2 | 4/2006 | Bryant |
| 7,025,887 | B1 | 4/2006 | Kirts et al. |
| 7,045,068 | B2 | 5/2006 | Hutchinson et al. |
| 7,153,417 | B2 | 12/2006 | Happel |
| 7,160,444 | B2 | 1/2007 | Peters, Jr. et al. |
| 7,160,465 | B2 | 1/2007 | Kirts et al. |
| 7,258,785 | B2 | 8/2007 | Weir et al. |
| 7,270,747 | B2 | 9/2007 | Happel et al. |
| 7,294,256 | B2 | 11/2007 | Happel et al. |
| 7,311,818 | B1 | 12/2007 | Gurfinkel |
| 7,410,576 | B2 | 8/2008 | Brouillard et al. |
| 7,455,780 | B1 | 11/2008 | Joyner et al. |
| 7,504,028 | B1 | 3/2009 | Gurfinkel |
| 7,638,065 | B2 | 12/2009 | Stever et al. |
| 7,662,296 | B2 | 2/2010 | Pancaldi et al. |
| D620,548 | S | 7/2010 | Vreeland |
| 7,780,855 | B2 | 8/2010 | Eberly |
| 7,815,800 | B2 | 10/2010 | Komatsu |
| 7,819,269 | B2 | 10/2010 | Perkins |
| 7,846,237 | B2 | 12/2010 | Wright et al. |
| 7,846,327 | B2 | 12/2010 | Happel et al. |
| 7,857,966 | B2 | 12/2010 | Duran et al. |
| 7,891,914 | B2 | 2/2011 | Smallwood et al. |
| 7,892,425 | B2 | 2/2011 | Generes et al. |
| 7,972,408 | B2 | 7/2011 | Bruso et al. |
| 8,070,960 | B2 | 12/2011 | Conwell |
| 2003/0121846 | A1 | 7/2003 | Use et al. |
| 2003/0121850 | A1 | 7/2003 | Use et al. |
| 2004/0222159 | A1 | 11/2004 | Peters, Jr. et al. |
| 2004/0226869 | A1 | 11/2004 | McClure et al. |
| 2005/0072718 | A1 | 4/2005 | Lacy et al. |
| 2005/0072738 | A1 | 4/2005 | Weir |
| 2005/0184007 | A1 | 8/2005 | Allard et al. |
| 2006/0006125 | A1 | 1/2006 | Tolmie et al. |
| 2006/0032809 | A1 | 2/2006 | Shaw et al. |
| 2007/0215533 | A1 | 9/2007 | Tittgen |
| 2007/0256966 | A1 | 11/2007 | Siviter et al. |
| 2008/0023074 | A1 | 1/2008 | Uemura et al. |
| 2009/0166279 | A1 | 7/2009 | Happel et al. |
| 2009/0200216 | A1 | 8/2009 | Robinson et al. |
| 2010/0078370 | A1 | 4/2010 | Happel |
| 2010/0181237 | A1 | 7/2010 | Duran et al. |
| 2012/0312755 | A1 | 12/2012 | Ryan et al. |
| 2013/0068679 | A1 | 3/2013 | Hannemann et al. |

OTHER PUBLICATIONS

Patent Cooperation Treaty Notification of Transmittal of the International Search Report and the Written Opinion of the International Searching Authority, or the Declaration for PCT/US2012/055665, Mar. 7, 2013, 5 pgs.
Al's list of dewatering bag companies dated May 17, 2012, 1 pg.
Notice issued by the State of New Jersey Department of Environmental Protection regarding Stormwater Construction Permits Request for Authorization, dated Oct. 1, 2009, 2 pgs.
Industry Problems Overview, 9 pgs., date not available.
Dandy Dewatering Bag Pumped Water Sediment Control System Guide Specifications, 11 pgs., date not available.
Sand Media Filter 60-4SK specification sheet, Rain for Rent, 1 pg., date not available.
Phoenix Portable Dewatering Systems specification sheet, PHOENIX Process Equipment Company, 1 pg., date not available.
Water-Based Drilling Fluid Dewatering Polymers specification sheet, KEMTRON Technologies, Inc., published 2009, 4 pgs.
Roll-Off Sludge Container with Dewatering Shell specification sheet, Wastequip, published Jul. 2010, 2 pgs.
DW500 Dewatering Aerator specification sheet, ESD Waste2Water, Inc., Jun. 18, 2008, 1 pg.
Griffin Dewatering Corporation specification sheet, 2 pgs., date not available.
Moos KSA specification sheet, Simon Moos Maskinfabrik a/s, 8 pgs. date not available.
Moos Lime Stabilization Unit specification sheet, Simon Moos Maskinfabrik a/s, 4 pgs., date not available.
MDU AquaTeqs Mobile Dewatering Unit specification sheet, AquaTeq Sweden AB, 2 pgs., date not available.
Mobile Dewatering Plant specification sheet, DEWA Water & Energy, 2 pgs., date not available.
SecCatch Dewatering Bag/Tube specification sheet, SedCatch, 2 pgs., date not available.
Erosion Control Products specification sheet, Granite Environmental, 1 pg., date not available.
Dewatering Pumps Synopsis specification sheet, Storm Drain Technologies, LLC, 1 pg., date not available.
SecCatch 10 oz Dewatering Bag/Tube specification sheet, SedCatch, 2 pgs., date not available.
Mirafi Dewatering Bag for Stormwater Sediment Control specification sheet, Tencate, 2 pgs., date not available.
Ultratech—Dewatering Bag specification sheet, Interstate Products, Inc., 1 pg., date not available.
Extended European Search Report for Application No. 12832323.5 dated Mar. 13, 2015, 7 pgs.

* cited by examiner

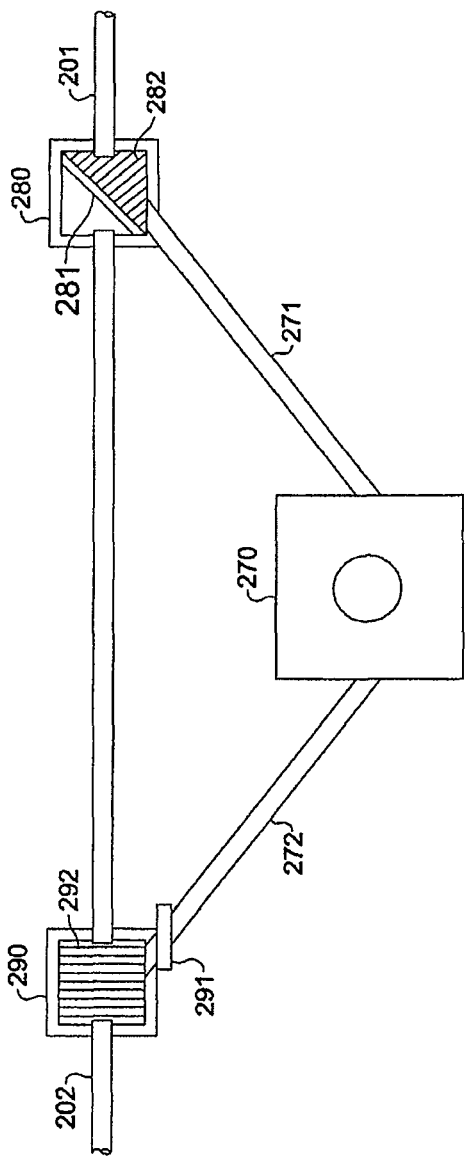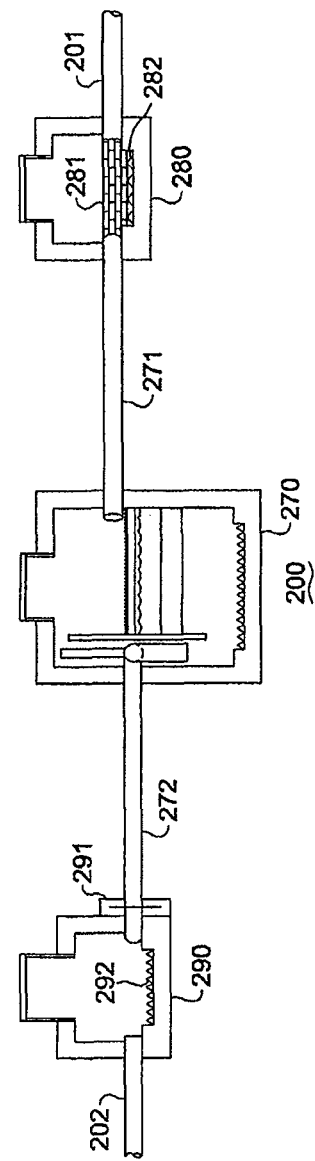

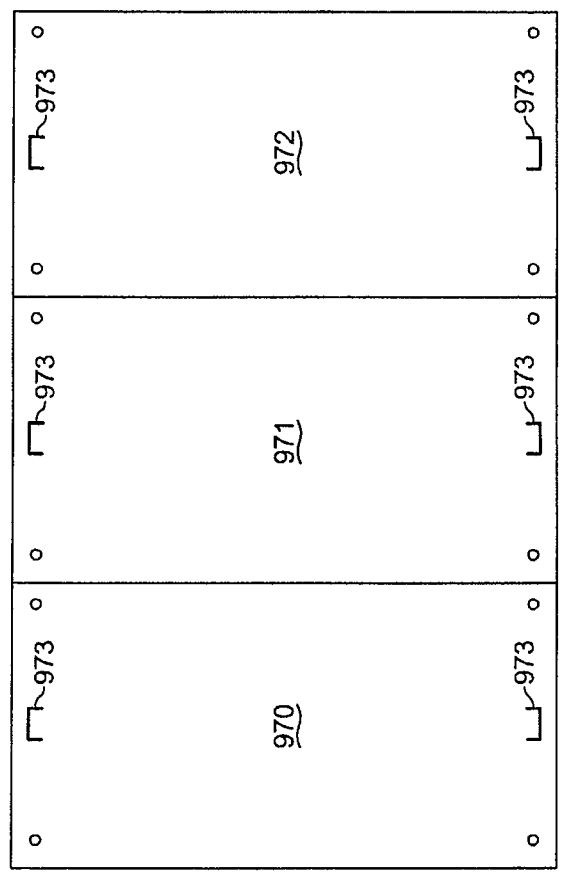

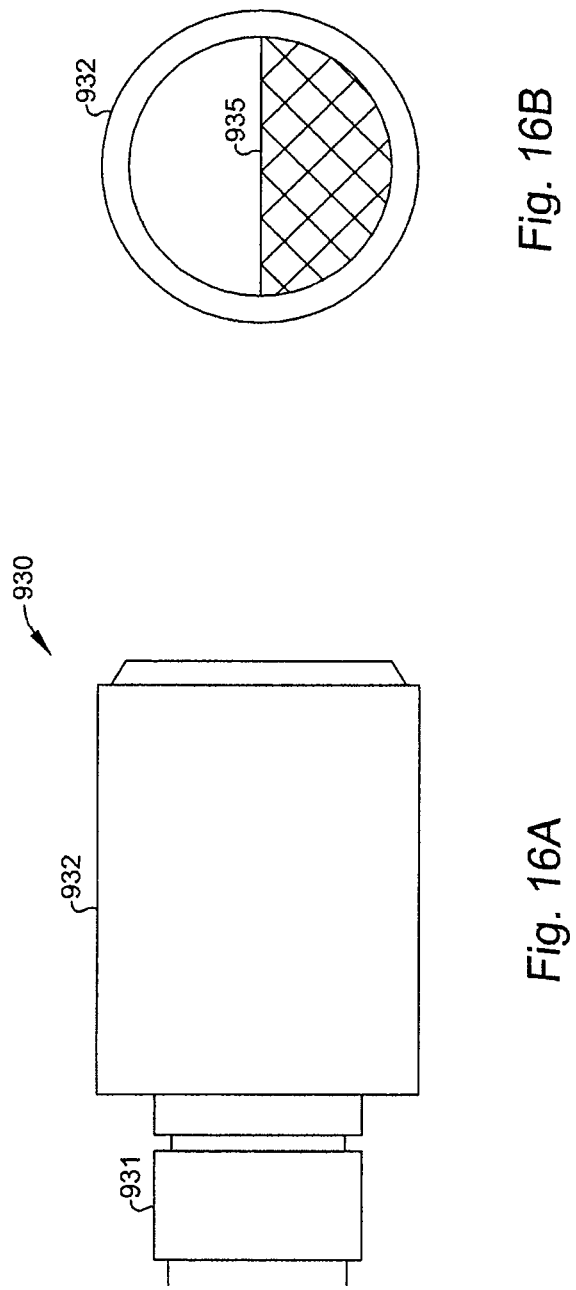

CONSTRUCTION SITE WATER TREATMENT SYSTEM AND METHODS

CROSS REFERENCE TO RELATED PATENT APPLICATION

The present invention is a continuation-in-part application and is related to, and claims priority from, U.S. patent application Ser. No. 13/234,019 filed Sep. 15, 2011 for: "APPARATUS, METHODS, AND SYSTEM FOR TREATMENT OF STORMWATER AND WASTE FLUIDS".

BACKGROUND OF THE INVENTION

1. Field of the Invention

The present invention generally relates to apparatus, methods, and systems for treating storm water and removing sediment and suspended solids in water discharged from construction, building and other sites where the discharge of suspended solids into riparian systems or storm drain systems is to be avoided, and, more particularly, to separating sand, oil, biomass, and other debris from water and reducing the amount of nutrients and nitrogen compounds in treated water. More broadly, the present invention relates to apparatus, methods, and systems for treating high volumes of liquids, mixtures, suspensions and the like to separate them into constituent parts; and for processing liquids, mixtures, suspensions and the like to remove solids and discharge water with less suspended solids.

2. Relevant Background

Modern storm drainage systems involve directing storm water to storm or sewer drains where the water is collected for later processing and disposal or simply discharged into larger bodies of water. In those systems, storm water is guided to flow from slopes and streets into the storm drains by the force of gravity. During that flow, storm water may pick up debris, trash (e.g., paper, cans, and cigarette butts), biomass (e.g., grass, leaves, excrement and discarded food), silt, sand, stone, oil, pollutants, heavy metals, and discarded medical devices and personal products (e.g., used needles and condoms) and other particles. Further, the storm drainage systems may also collect other run-off water such as water used for irrigation. Storm water and run-off water may naturally flow through soil or other terrains and pick up organic matter or chemicals, such as plants, leaves, hydrocarbons, nitrates, or other compounds.

There is a great deal of interest in effectively processing storm water. Drainage systems usually flow into natural water systems, such as oceans, lakes, rivers, streams, and other similar bodies of water. It would help protect the environment if there was a realistic, cost-effective capability to separate out man-made and natural contaminants and pollutants before the drainage is directed into the natural water systems and avoid upsetting the natural ecological balance of such systems. Further, if storm water and other run-offs can be effectively treated and recaptured as clean water, or at least as gray water, there is a potential that the recaptured water can help satisfy domestic needs for water.

There is also considerable interest in treating fluids for mining, agriculture, and industrial use. Besides the treatment and purification of water, the products separated from the fluid during treatment may be of value. For example, minerals in run-offs from mining or farms that contain high nutrient contents, various constituents of lubricants, and the like may be separated, collected, and reused or recycled. Further, the recovery of fluids or solids in industrial applications and from waste streams may be of interest.

Construction and building sites frequently collect or produce significant amounts of storm water runoff, containing high levels of suspended solids, that needs to be pumped away from the site. Riparian and storm drain systems may be unable to accommodate the discharged fluid, especially the large amount of sediment that may be deposited. In order to protect the environment near such sites, government regulations may require that water from the sites be processed beforehand to reduce the amount of suspended solids that is discharged. Typically, the discharged water is not environmentally hazardous but may contain gravel, dirt, sand, clay, and other suspended solids that need to be removed or reduced in concentration. After removing or reducing the concentration of the suspended solids, the processed water may be suitable for discharge into a nearby water system.

Storm water runoff and groundwater are typically stored in a pond on site which may slowly evaporate or soak into the surrounding earth. Such ponds may overflow onto roads, into streams, across property, and into low lying areas causing flooding and depositing large amounts of sediment.

The process of removing suspended solids from large volumes of water stored at construction and building sites is frequently called "dewatering." The usual method of dewatering involves the use of a dewatering bag. Dewatering bags, also known as dirt bags, gravity bag filters, and sediment filter bags are simply large, rectangular filter bags fed by one or more sources of water needing treatment. A pump is typically used to move water from a storage pond to feed the dewatering bag.

The water flows into the interior of the bag and passes through the wall of the bag. The wall of the bag filters out solids of a particular size. The water leaches through the surface of the bag to the surrounding environment. In essence, dewatering bags are large filters that separate suspended solids from the water. The bag fills with solids and then may be discarded.

The appropriate size of a dewatering bag for a particular application is generally determined by the flow rate and components in the water that needs to be processed. The amount of solids in the water can affect the size of the dewatering bag needed because a large sediment burden will more quickly fill a bag and clog the pores in the bag material. Certain solids, like clay, will clog dewatering bags very quickly.

In estimating the appropriate size of the dewatering bag for a particular application, a selected bag that is too large for the task wastes money and takes up valuable space at the site while a bag that is too small for the task will necessitate the use of multiple dewatering bags, a schedule for monitoring and replacing those bags, and the time, effort, and expense of actually monitoring and replacing the extra bags.

Moreover, variations in the flow rate and the components in the water pumped from the site may necessitate the acquisition of an inventory of bags to accommodate those variations. If a high flow rate is desired, a larger dewatering bag (e.g., fifteen feet by fifteen feet) may be deployed, or multiple dewatering bags may be fed by a manifold of hoses in parallel, or a dewatering "tube" that can be hundreds of feet long may be deployed. These large bags and tubes are cumbersome, expensive, and will, due to the weight of the water and collected sediment exert a great load on the surface. Such loads can be detrimental to the ground and other surfaces. The flow of water through the bag (or tube) may also cause erosion in the surrounding area in a pattern that may be difficult to predict.

Another problem with dewatering bags is that they are usually designed to be used only once before being discarded. The use of a disposable dewatering bag is not environmentally-friendly because the bag, with or without its contents, is typically made of a synthetic material that will need to be disposed. In addition, a filled bag lying on the ground will require heavy machinery to move. It may be impossible to move a bag that is partially filled without ruining it. Reusable bags present the difficulty of transporting the heavy bag and removing a heavy load of sediment from a relatively fragile bag.

The fragility of a dewatering bag presents issues as well. A bag can be punctured or torn at a construction site by the surface on which it is placed or by inadvertent contact with machinery. As it fills, dewatering bags may stretch to adopt a different footprint. A bag that is filled or exposed to excessive water pressure may burst. At high pressures, the bursting of a bag could become a dangerous explosion of water and sediment.

Better methods and systems are needed for dewatering large quantities of fluid to remove suspended solids.

U.S. Pat. No. 7,311,818 to Gurfinkel discusses an approach to a water separation unit having an inner and outer housing for storm water collection. Storm water enters the inner housing where water and debris are supposed to be separated. A series of hollow tubes connect the inner housing to the outer housing to allow liquid to pass into and collect in the outer housing and flow out of the unit through a network of discharge pipes. One problem with that approach is that the tubes can be clogged with debris. Another problem with that approach is that most of the silt and sand is not collected at the tube level in the inner housing; rather, it flows through the tubes and can be drawn into the discharge pipe and exit the outer housing. Yet another problem with that approach is that the unit must be completely drained before cleaning.

U.S. Pat. No. 7,846,327 to Happel, commercialized as the Nutrient Separating Baffle Box from Suntree Technologies, discusses an approach to a storm water filter box having a fixed basket to collect debris and a floatable skimmer to prevent floating debris that passed through the basket from leaving the box. The skimmer is positioned within the box between the inlet and the outlet and rises and falls with the water level in the box. Storm water is directed to pass through the basket to the skimmer where floating debris is collected. One problem with that approach is that moving parts that can break or jam are required for the skimmer to move. Another problem is that floating debris stays in contact with the wastewater, promoting decomposition of the debris.

U.S. Pat. No. 7,857,966 to Duran discusses an approach to a storm water inlet apparatus having inlet and outlet pipes on level with each other where wastewater flows directly through a catch basin. The apparatus includes a hood and skirted boom affixed to an interior wall of the basin over the outlet pipe. Wastewater flows beneath the hood and skirted boom and out through the outlet. In the process, heavier-than-water sediments sink to the bottom of the basin while lighter-than-water debris floats on top of the wastewater in the basin. One problem with that approach is that a sealed hood prevents airflow, allowing a siphon to develop and pull the level of the wastewater down and potentially draw in the floating debris, thus reducing the performance of the apparatus. Also, the debris stays in contact with the wastewater, promoting decomposition of the debris.

U.S. Pat. No. 7,780,855 to Eberly discusses an approach to a system for storm water treatment. A treatment unit is connected to a control chamber through which fluid flows. The fluid is diverted via a control partition to an inlet pipe into the unit for treatment and returned through an outlet pipe. If the fluid flow exceeds the capacity of the inlet pipe, excess fluid flows over the control partition to the outlet of the control chamber. A problem with the approach is that it is not well-suited for a retrofit application due to the lack of significant grade between the inlet and outlet of the control chamber. Another problem with that approach is that there is no separation between different types of debris, i.e. biomass, hydrocarbons, silt and sand, etc.; everything is mixed in a potentially toxic soup.

U.S. patent Ser. No. 10/430,170 to Peters et al. discusses a system for removing contaminants from storm water. Storm water flows through a process chamber comprising a series of vertical baffles that extend from the top, bottom, and sides of the chamber. Storm water flows through the chamber around the baffles, and debris is trapped along the bottom of the chamber and by filters placed in the gaps between the baffles and the chamber. One problem with that approach is that all filtration is done in the water; thus, debris stays in contact with the water promoting decomposition of the debris. A further problem with that approach is that all debris is collected at the bottom of the chamber, limiting the capacity of the chamber for collecting debris. Another problem with that approach is that the relatively small gaps between the baffles and the chamber may become easily clogged with debris.

There is further need for an efficient, cost-effective apparatus methods and systems for separating storm water, operating fluids, lubricants, coolants, wastewater and the like to separate out solids, hydrocarbons, contaminants and pollutants, and recapture and recycle desired components.

SUMMARY OF THE INVENTION

Accordingly, the invention is directed to apparatus, methods and systems for treatment of storm water and other fluids mixed with solids and liquids.

An objective of an embodiment of the invention is to provide an apparatus for the efficient separation of debris, biomass, silt, sand, hydrocarbons, and nutrient compounds from storm water. A further objective includes the effective separation of biomass from collected hazardous pollutants that results in the biomass being treated as ordinary garbage rather than hazardous waste.

Another objective of an embodiment of the invention is to provide a storm water treatment apparatus that is self-contained, allowing for simple installation and maintenance. A further objective is to provide an apparatus that is compact, easily installed in a city street with existing drainage trunk line, and easily installed in a high water table area with shallow storm water systems.

Yet another objective of an embodiment of the invention is to provide a storm water treatment system capable of diverting water off-line to avoid swamping a treatment unit in the event of overflow conditions. A further objective includes a system that will not reintroduce collected pollutants back into the storm drain system. A still further objective is to prevent bacteria, dead rodents, and other debris considered to be health hazards from backwashing and resurfacing on roadways and other property.

A further objective of an embodiment of the invention is to provide a fluid treatment apparatus and system for separating lubricants, cooling fluids, industrial fluids, agricultural fluids, mining fluids, and the like.

A still further objective of an embodiment of the invention is to provide a fluid treatment apparatus and system with no moving parts.

A still further objective of an embodiment of the invention is to provide a fluid treatment system that requires no chemicals or additives of any kind.

Another objective of an embodiment of the invention is to provide fluid treatment apparatus, methods and systems for the treatment of fluid mixed with solids.

Another objective of an embodiment of the invention is to provide a portable fluid treatment apparatus, methods and systems for the treatment of fluid mixed with solids.

Another objective of an embodiment of the invention is to provide a fluid treatment system for the efficient separation of debris, biomass, silt, sand and other solids from discharged fluid.

Another objective of an embodiment of the invention is to provide a fluid treatment apparatus for fluid mixed with solids that is self-contained, compact, and portable, allowing for simple installation, removal, and maintenance.

Another objective of an embodiment of the invention is to provide a suspended solids treatment system separates suspended solids from water by gravitational sedimentation.

Additional features and advantages of embodiments of the invention will be set forth in the description which follows, and will be apparent from the written description and claims hereof, as well as the appended drawings.

According to an aspect of an embodiment of the invention, a storm water and fluid treatment unit comprises a separation container connected to an inlet and an outlet, a wall with an open top and bottom space within the container between the inlet and outlet, a wire mesh under the inlet, a drain pipe extending downward from the outlet, and a vent pipe connected to the outlet. According to another aspect of an embodiment of the invention, the drain pipe comprises a manifold. In a further aspect of an embodiment of the invention, the manifold comprises a pipe loop with an upper surface cut-out in the lower portion of the loop.

According to an aspect of an embodiment of the invention, a storm water or fluid treatment unit separates storm water or other fluids from debris by density relative to a main liquid. Fluid enters the unit from an inlet and flows into a pool of liquid, under a wall extending into the pool and out through an outlet at a level below the inlet. The unit includes a wire mesh beneath the inlet to collect large debris and a vent pipe connected to the outlet to avoid a vacuum condition in the outlet.

According to another aspect of an embodiment of the invention, a storm water and fluid treatment system comprises two drainage flow chambers coupled via a drainage trunk line, a fluid treatment unit coupled to the two drainage flow chambers by an inlet pipe and an outlet pipe, respectively, and a baffle in the inlet drainage flow chamber extending no higher than the top of the inlet pipe.

According to an aspect of an embodiment of the invention, a storm water and fluid treatment system effects an off-line diversion of storm water or other fluids to a storm water or fluid treatment unit from a drainage trunk line. A fluid treatment unit is coupled to two drainage flow chambers along the drainage trunk line via an inlet and an outlet, respectively. The inlet drainage flow chamber comprises a baffle that diverts a flow of fluid in the trunk line into the unit. If the unit reaches its capacity, the baffle allows the excess to flow through the existing trunk line.

According to a further aspect of an embodiment of the invention, a storm water treatment system includes first and second flow chambers connected by a connecting drainage trunk line, an inlet drainage trunk line coupled to the first chamber, an outlet drainage trunk line coupled to the second chamber; a storm water treatment unit coupled to the first chamber via an inlet pipe and to the second chamber via an outlet pipe, wherein the first chamber comprises a baffle that has a height no greater than a top of the inlet pipe at the first chamber. The storm water treatment system may further comprise a backflow preventer; the inlet drainage trunk line, the connecting drainage trunk line, and the outlet drainage trunk line may have the same pitch; and the inlet drainage trunk line, the connecting drainage trunk line, and the outlet drainage trunk line may be collinear.

According to another aspect of an embodiment of the invention a method of retrofitting an existing fluid trunk line or storm water trunk line includes the steps of replacing a first section of trunk line with a first chamber, replacing a second section of trunk line with a second chamber downstream and separated from the first chamber; and installing a fluid treatment unit coupled to the first chamber via an inlet pipe and to the second chamber via an outlet pipe; wherein the first chamber includes a baffle that has a height no greater than a top of the inlet pipe at the first chamber. A backflow preventer may also be installed at the outlet pipe or the second chamber. The fluid treatment unit may be a fluid treatment unit according to an embodiment of the invention, a storm water treatment unit according to an embodiment of the invention or another fluid or storm water treatment unit.

According to a still further aspect of an embodiment of the invention, a portable fluid treatment apparatus for treating an inlet fluid includes a container connected to an inlet pipe and to an outlet pipe wherein the outlet pipe is at a position lower in the container than the inlet pipe; a wall within the container between the inlet pipe and the outlet pipe; wherein the wall defines a top space between a top of the wall and a top of the container; wherein the wall defines a bottom space between a bottom of the wall and the bottom interior surface of the container; wherein the wall defines a first interior section of the container on an inlet side of the container; and wherein the wall defines a second interior section of the container on an outlet side of the container; a collector in the first interior section at a level lower than the inlet pipe; a drain pipe extending downward inside the container from the outlet pipe; and a vent pipe extending upward from the outlet pipe.

According to yet another aspect of an embodiment of the invention, a portable fluid treatment apparatus for treating an inlet fluid containing suspended solids includes a tank having a front, a back, a right side, a left side, a bottom and a removable top; wherein the tank includes a plurality of sedimentation units; wherein each of the sedimentation units includes a container connected to an inlet pipe and to an outlet pipe wherein the outlet pipe is at a position lower in the container than the inlet pipe; a wall within the container between the inlet pipe and the outlet pipe; wherein the wall defines a top space between a top of the wall and a top of the container; wherein the wall defines a bottom space between a bottom of the wall and a bottom interior surface of the container; wherein the wall defines a first interior section of the container on an inlet side of the container; and wherein the wall defines a second interior section of the container on an outlet side of the container; a collector in the first interior section at a level lower than the inlet pipe; a drain pipe extending downward inside the container from the outlet pipe; and a vent pipe extending upward from the outlet pipe.

According to a further embodiment of the invention, a method of treating inlet water mixed with solids includes the steps of directing the inlet water into an inlet of a treatment unit, deflecting the inlet water to spread across a horizontal collector, collecting solids in the horizontal collector, blocking the horizontal flow of inlet water with an internal wall inside the treatment unit at a level of the inlet, flowing the inlet water underneath the internal wall and up into an outlet pipe below the level of the inlet, and flowing the inlet water into an inlet of a second treatment unit.

It is to be understood that while the invention has been described in conjunction with the detailed description thereof, the descriptions contained herein are intended to illustrate and not limit the scope of the invention.

BRIEF DESCRIPTION

FIG. 1 comprises a set of diagrams of a storm water treatment unit according to an embodiment of the invention. FIG. 1A shows a top view of the unit. FIG. 1B shows a front view of the unit. FIG. 1C shows a side view of the unit.

FIG. 2 comprises a set of diagrams of a storm water treatment system according to an embodiment of the invention. FIG. 2A shows a top view of the system. FIG. 2B shows a side view of the system.

FIG. 11 is a diagram of a top view of a cover for the top of a fluid treatment system according to an embodiment of the invention.

FIG. 16A is a diagram of an outflow pipe between fluid treatment units according to an embodiment of the invention.

FIG. 16B is a diagram of a screen weir in an outflow pipe according to an embodiment of the invention.

DETAILED DESCRIPTION OF THE PREFERRED EMBODIMENTS

Embodiments of the present invention are hereafter described in detail with reference to the accompanying figures and are provided for purposes of illustration only and not for the purpose of limiting the invention as defined by the appended claims and their equivalents. Descriptions of well-known functions and constructions are omitted for clarity and conciseness. The figures are meant to illustrate features of exemplary embodiments of the invention and are not drawn to scale.

Figure 1B:
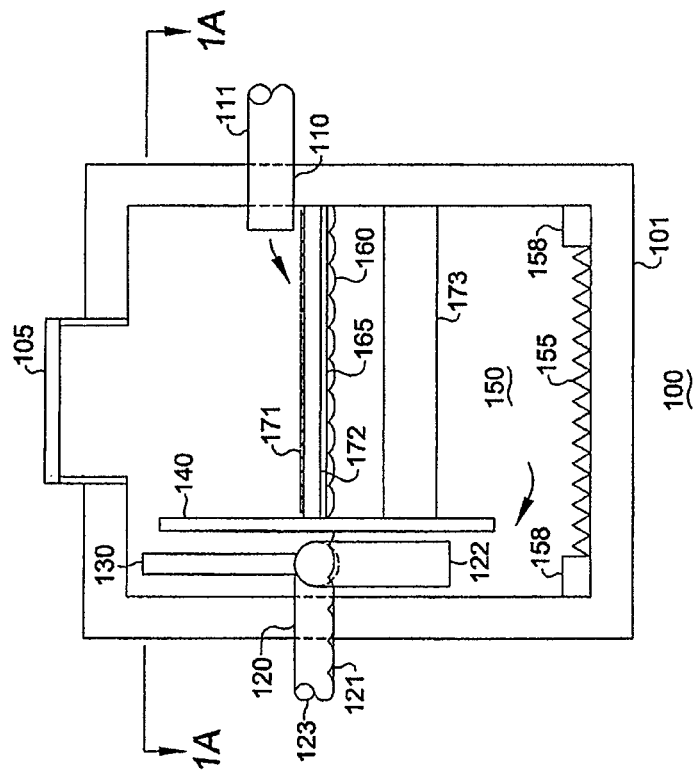
Figure 1A:
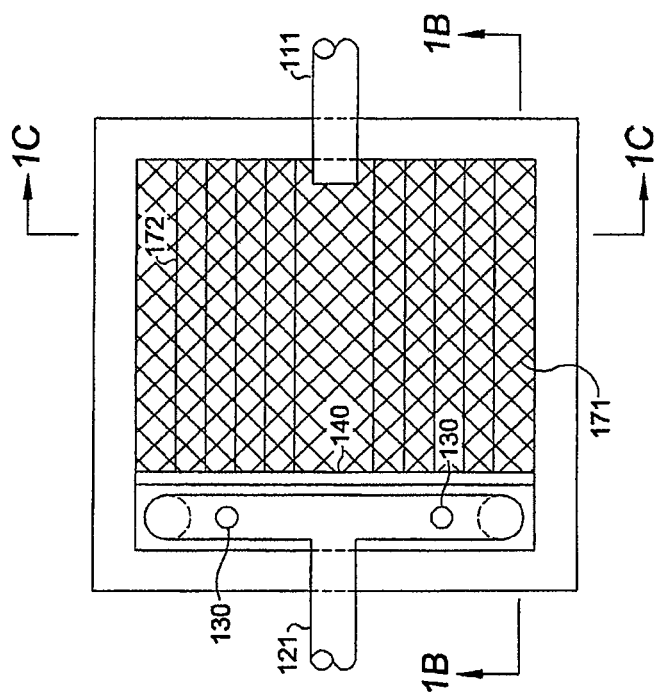
Figure 1C:
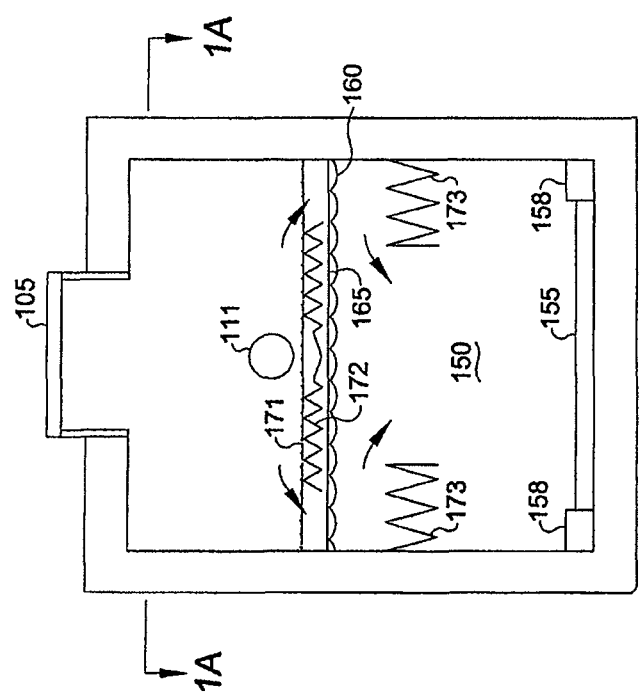

FIG. 1 illustrates a storm water treatment unit according to an embodiment of the invention. FIGS. 1A, 1B, and 1C show respective top, front, and side views of the unit.

Storm water treatment unit 100 is housed in containment vault 101. Preferably, the dimension of the vault is 6' long×7' wide×8'4" tall, and the vault is made of liquid-impermeable concrete with walls that are 6" thick. The dimensions of the vault can be adjusted depending on the application and can be made of other suitable materials such as metal or plastic. The interior of the vault defines a chamber 150.

Containment vault 101 has three openings connecting to chamber 150: inlet 110, outlet 120, and access opening 105. Inlet 110 is placed on one side of chamber 150 and is preferably 12" in diameter and is fitted with a similarly sized pipe 111. Outlet 120 is placed on the opposite side of chamber 150 and is preferably 12" in diameter and is also fitted with a similarly sized pipe 121. Access opening 105, preferably in the form of a manhole, is preferably located at the top of vault 101 and is fitted with a cover. Preferably, materials for the pipes can be PVC, metal, or other types of materials suitable for use with the fluids and contaminants anticipated. Inlet 110, outlet 120, and the pipes 111 and 121 can be of other suitable sizes to accommodate different volumes of fluid and flow rates.

In a preferred embodiment, inlet 110 is positioned at about five inches higher than outlet 120. Inlet 110 and outlet 120 are thus very similar in height, allowing for a shallow installation of the unit in areas with a high water table that cannot support a large difference in height between inlet 110 and outlet 120.

Outlet pipe 121 extends through outlet 120 and bends downward toward the bottom of chamber 150 in vault 101. Inlet 122 of pipe 121 faces downward towards the bottom of chamber 150. Outlet pipe 121 is separated from chamber 150 by wall 140. Wall 140 preferably extends from above outlet 120 to a position midway between outlet 120 and the bottom of chamber 150 allowing liquid in chamber 150 to flow to pipe 121. The height of inlet 122 is at or above the lower end of wall 140. Optionally, portions of outlet pipe 121 below outlet 120 may be perforated to further diffuse the draw of liquid by allowing liquid to enter through the sides of pipe 121.

If the outlet 123 of pipe 121 extends lower than water level 160 (as is normally expected to allow flow through pipe 121), the flow of water in pipe 121 could create a siphon that would draw down the water level 160 in chamber 150 to the height of inlet 122 of outlet pipe 121. Vent pipe 130 connects to and extends upward from outlet pipe 121. Vent pipe 130 allows airflow into pipe 121 to avoid the creation of a siphon during high volume flows. Alternatively, pipe 121 could be perforated below water level 160 to allow airflow if water level 160 falls below the bottom of outlet 120 and reduce or avoid a siphon effect.

A space exists between the top of wall 140 and the top of chamber 150 to allow air flow near vent pipe 130 and to prevent the siphoning effect. Wall 140 further serves as a physical barrier to protect pipe 121 from the pressure of inlet water and debris flowing from inlet pipe 111. Wall 140 is preferably made of stainless steel, plastic, or other material suitable for use with the fluids and contaminants anticipated.

Wire mesh 171 is located beneath inlet pipe 111 and is preferably above the lowest part of the outlet 120. Due to the equalization of pressures, water level 160 should normally be at the level of the lowest part of outlet 120 as a higher water level should cause a flow out of outlet pipe 121. Wire mesh 171 is preferably located above water line 160 and separates out large debris from the inlet stream of storm water. Wire mesh 171 is preferably a metal grate or wire mesh with suitably-sized holes to collect debris from the inlet fluid at the top of the wire mesh while allowing smaller debris, particles, and fluids to flow through. Wire mesh 171 collects leaves and other large clumps of biomass above the water level, and prevents the collected debris from soaking in the liquid in chamber 150 or floating at the water level 160. By keeping the biomass on wire mesh 171 out of the pool of water, the decomposition process for that biomass is slowed and the leaching of ammonium nitrate, other nitrates, and other components from the organic matter is reduced. By keeping trash and other larger debris on wire mesh 171 out of the pool of water, the leaching of chemicals, contaminants and pollutants into the water is reduced.

In the preferred mode of operation of storm water treatment unit 100, inlet water flows into chamber 150 from inlet pipe 111 from the side, flows into the pool of water in chamber 150 and flows out of chamber 150 through outlet pipe 121. Preferably, chamber 150 is pre-filled with water to a level above inlet 122. The inlet water, which could be from storm water, run-offs, or other sources, contains varying degrees of debris, biomass, and other solid, semisolid and particulate materials. These materials include heavier-than-water elements such as sand and metals and lighter-than-water elements such as plastics, grease, oil and other hydrocarbons. Storm water treatment unit 100 works by separating elements in the contaminated water by density. As the inlet water flows through wire mesh 171, heavier elements settle as sediment to the bottom of chamber 150; lighter elements float on top of water line 160 as floating debris 165.

If oil, or other petroleum product, is introduced to the unit as part of floating debris 165, the oil acts as a cover reducing, if not eliminating, the flow of air (e.g., oxygen) into the collected fluid in the unit and, thus, retards the growth of bacteria, algae, and the like in the collected fluid. The reduction in such growth of microorganisms lengthens the maintenance cycle of the unit and reduces a health hazard for maintenance workers and the environment.

Due to the height of the lower end of wall 140, liquid from the midsection of chamber 150 is drawn into inlet 122. Due to the separation process, the liquid drawn into inlet 122 contains less of the lighter elements and heavier elements than the original storm water. Preferably, wall 140 is positioned high enough to avoid pipe 121 drawing sediment (not shown) from the bottom of chamber 150.

In maintenance, storm water treatment unit 100 is cleaned periodically depending on the capacity of the unit, volume of storm water processed, and the contamination levels. Dried leaves, other biomass, and trash can be collected from wire mesh 171. Floating debris 165, such as oil and grease, can be skimmed from the surface of water level 160. Collected sediment can be vacuumed or otherwise removed from the bottom of chamber 150. Optionally, a vacuum can be used to collect other portions of the liquid in chamber 150. As such, the open and modular design of unit 100 keeps the unit accessible for easy maintenance and cleaning.

Referring to FIG. 1A, in an embodiment of the invention, outlet pipe 121 is preferably a manifold comprising of two or more pipes extending down into chamber 150. The pipes of the manifold can be placed such that they take a diffused draw from different locations of chamber 150. This arrangement helps in reducing collected sediments at the bottom of chamber 150 from drawing into pipe 121 and in evening the pattern of the collected sediment as compared to the use of a single centrally-located outlet pipe inlet. In another embodiment of the invention, a single centrally-located outlet pipe inlet is used.

In another embodiment of the invention, a deflector (not shown) is located beneath inlet pipe 111 and above wire mesh 171. Incoming storm water pours on to the deflector and is scattered. The deflector helps slow the inlet water pouring out of pipe 111 and prevents the inlet water from taking a deep plunge that would drive materials through wire mesh 171 and cause large turbulence that would disrupt the settling of sediment at the bottom of chamber 150. In another embodiment of the invention, the deflector may be a sprinkler board that diverts the flow of water and spreading the water throughout the length and width of the chamber. Numerous other water deflecting configurations attached to inlet pipe 111 or positioned in the stream of inlet water will be apparent to one of ordinary skill in the art.

In a preferred embodiment of the invention, collectors 172 and 173 are located beneath wire mesh 171. Collectors 172 and 173 are preferably made of stainless steel and shaped with grooves to present a saw tooth cross-section to slow the rush of the inlet water into chamber 150 and help collect sediment. Collectors 172 and 173 increase surface area contact with the inlet water and may be angled, textured, coated, magnetized or use other cross-sectional shapes, to collect certain materials. In a preferred embodiment, the grooves of collector 172 are four inches deep and the grooves of collectors 173 are twelve inches deep. Alternatively, collectors 172 and 173 may include a pattern of projections that induces turbulence to collect certain materials such as is used in mining operations. Collectors 172 and 173 could also be magnetized to collect certain metals. In a further embodiment of the invention (not shown), collectors 173 are placed above water line 160. In a still further embodiment of the invention, multiple levels of collectors 172 and 173 are used to cascade inlet water. The height of collectors 172 and 173 may be adjustable.

Optionally, collector 155 is located at the bottom of chamber 150 and collects sediment in a manner similar to that of collectors 172 and 173. Collector 155 is also preferably made of stainless steel and shaped with grooves to create a saw tooth cross-section. Collector 155 has increased surface area contact with the flowing fluid and may be angled, textured, coated, magnetized, or utilize other cross-sectional shapes to collect certain materials from the fluid. The grooves of collector 155 are preferably two inches deep.

Also optionally, filler blocks 158 are placed in the bottom corners of chamber 150. Filler blocks 158 shape the bottom of chamber 150 to help reduce turbulence in the water flow and further aid in the efficiency of collecting the sediments and increasing the distance between collected sediment at the bottom of chamber 150 and inlet 122.

In a further embodiment of the invention, the position or dimensions of wall 140 are adjustable to adjust the flow of water to inlet 122 and adjust the efficiency of the treatment process or extract water from different levels within chamber 150—i.e., closer to water level 160 versus closer to the bottom of chamber 150. In another embodiment of the invention, wall 140 is perforated to allow a selective extraction from different levels within chamber 150. In yet another embodiment of the invention (not shown), inlet 122 and vent pipe 130 are omitted, leaving outlet pipe 121 flush with the opening of outlet 120 to extract fluid from chamber 150 through the perforated wall. Different levels of fluid in chamber 150 may be extracted depending on the placement of perforations in the wall.

FIG. 2 illustrates a storm water treatment system according to another embodiment of the invention. FIG. 2A shows a top view and FIG. 2B shows a side view of the system.

Storm water treatment system 200 can be built to modify an existing drainage trunk line with trunk line inlet 201 and trunk line outlet 202. In an exemplary embodiment, drainage flow chambers 280 and 290 and storm water treatment unit 270 are added to the existing trunk line. The side view of the system shown in FIG. 2B does not show the existing trunk line for simplified illustration. System 200 has the advantage of off-trunk line operation that runs parallel to the existing drainage trunk line.

Chamber 280 includes baffle 281 which comprises a short angled wall for diverting flow from inlet 201 to connecting pipe 271. Connecting pipe 271 connects chamber 280 with treatment unit 270. Connecting pipe 272 connects treatment unit 270 with chamber 290. A conventional backflow preventer 291 is preferably provided in or near the junction of pipe 272 and chamber 290. Treatment unit 270 may have a conventional design or a design in accordance with the present invention (as shown).

In the operation of system 200, inlet water from trunk line inlet 201 is diverted via baffle 281 into pipe 271 and into storm water treatment unit 270. The water is treated in unit 270 and returns to chamber 290 via pipe 272. The treated water flows from chamber 290 into trunk line outlet 202. Backflow preventer 291 reduces or prevents the return of outlet water to storm water treatment unit 270 via outlet pipe 272.

In a preferred embodiment of the invention, chambers 280 and 290 are lined with collectors 282 and 292, respectively, at the bottom of the chambers. Collectors 282 and 292, similar to collectors 172, 173, and 155 in FIG. 1, are preferably made of stainless steel and shaped with grooves to present a saw tooth cross-section to collect sediment. Collectors 282 and 292 are preferably aligned with the saw tooth cross-section perpendicular to the flow of water, e.g., collinear with pipe 271 for collector 282 and with pipe 202 for collector 290, to maximize the collection of sediment. Collectors 282 and 292 may also be textured, coated, or magnetized or utilize other cross-sectional shapes to collect certain materials. The grooves of collectors 282 and 292 are preferably two inches deep.

Figure 3:
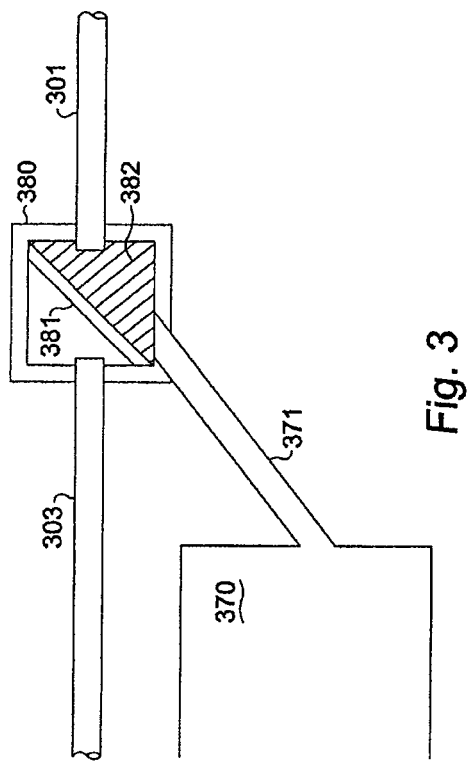
FIG. 3 is a diagram of an inlet drainage flow chamber for a storm water treatment system according to an embodiment of the invention.

FIG. 3 illustrates an inlet drainage flow chamber for a storm water treatment system according to an embodiment of the invention.

Drainage flow chamber 380 is connected to inlet 301 from an existing drainage trunk line, outlet 303 to an existing drainage pipeline, and pipe 371 to a storm water treatment unit 370. Baffle 381 in chamber 380 diverts the ordinary flow of inlet water from inlet 301 to pipe 371 for water treatment. An overflow of inlet water passes over baffle 381 to outlet 303. Baffle 381 is preferably built with 6" thick concrete or concrete blocks, but may be built with other suitable materials with other dimensions. In a preferred embodiment, baffle 381 extends to a height no higher than the top of pipe 371 and collector 381 is positioned at the bottom of chamber 380.

In operation, as the inlet water enters drainage flow chamber 380 from inlet 301, the water is blocked off from outlet 303 by baffle 381 and is diverted to pipe 371 into a storm water treatment unit 370 for treatment. If an overflow condition starts to build in storm water treatment unit 370 causing the water level in pipe 371 to rise to the top of the pipe, the water level in chamber 380 rises to the top of baffle 381 and the excess inlet water flows over the top of baffle 381 into outlet 303 of the drainage trunk line. Effectively, chamber 380 with baffle 381 acts as an overflow prevention system for the unit 370. Preventing overflow in storm water treatment unit 370 is an important aspect of the system because an overflow condition may cause debris, sediment, contaminants, pollutants and the like collected by the unit to be flushed out of the unit and back into the drainage system reducing, or entirely negating the unit's performance. Alternatively, in cases where an unexpected volume of storm water flows through inlet 301 exceeding the capacity of pipe 371, the water level in chamber 380 will rise and the excess flow will pass over baffle 381 to outlet 303.

Figure 4:
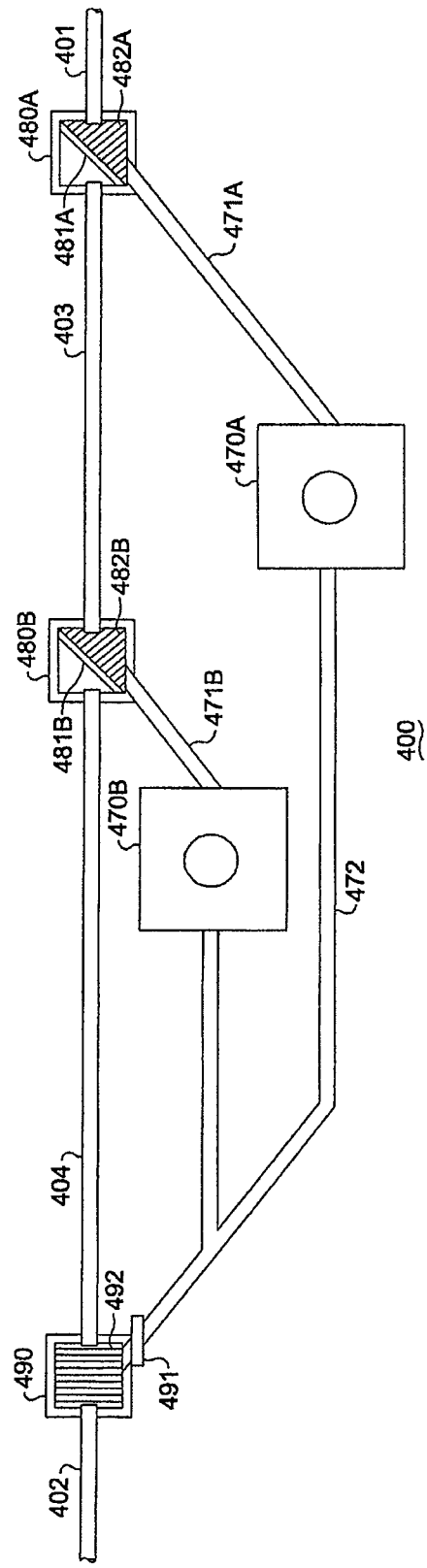
FIG. 4 is a diagram of a storm water treatment system according to another embodiment of the invention.

FIG. 4 illustrates a storm water treatment system according to another embodiment of the invention. Preferably, the system is used for heavy storm water flow. Additional units may be added as necessary.

Storm water treatment system 400 comprises two off-line storm water treatment units 470A and 470B arranged in a parallel configuration. Flow drainage chambers 480A is connected to trunk line inlet pipe 401 and, via pipe 403, to chamber 480B. Chamber 480B is connected via pipe 404 to chamber 490. Chamber 490 is connected to trunk line outlet pipe 402 of the existing drainage trunk line.

Flow drainage chambers 480A and 480B, with collectors 482A and 482B is positioned at the bottom of the chambers, respectively, divert water flow via baffles 481A and 481B, respectively, to pipes 471A and 471B, respectively. Pipes 471A and 471B connect to the inlets of storm water treatment units 470A and 470B, respectively. The outlets of units 470A and 470B are connected to outlet pipe 472.

In operation, inlet water from inlet 401 is diverted by baffle 481A to pipe 471A to water treatment unit 470A. If an overflow condition occurs in chamber 480A, the excess inlet water overflows baffle 481A to pipe 403 and enters flow drainage chamber 480B. Baffle 481B diverts the inlet water into water treatment unit 470B. If an overflow condition occurs in chamber 480B, the excess inlet water overflows baffle 481B to pipe 404.

Treated water flows out of units 470A and 470B into pipe 472, through backflow preventer 491 and into chamber 490, includes collector 492 at the bottom of chamber 490. In an exemplary embodiment of the invention, pipe 472 is 18" in diameter. Backflow preventer 491 is a conventional backflow preventer to reduce or prevent water from flowing from chamber 490 into pipe 472. Optionally, the outlets of units 470A and 470B may also be equipped with backflow preventers.

While system 400 contains only two storm water treatment units arranged in parallel, further units can be added and arranged in the configuration of unit 470B.

The storm water treatment unit and system has advantageous application to other uses besides storm water treatment. Filtering run-offs from mining operations, processing fluids used in oil well fracturing operations, recycling cooling fluids for cutting blades, processing contaminated lubricants containing metal shavings, and like applications may be implemented with the treatment units and systems according to the present invention.

Figure 5:
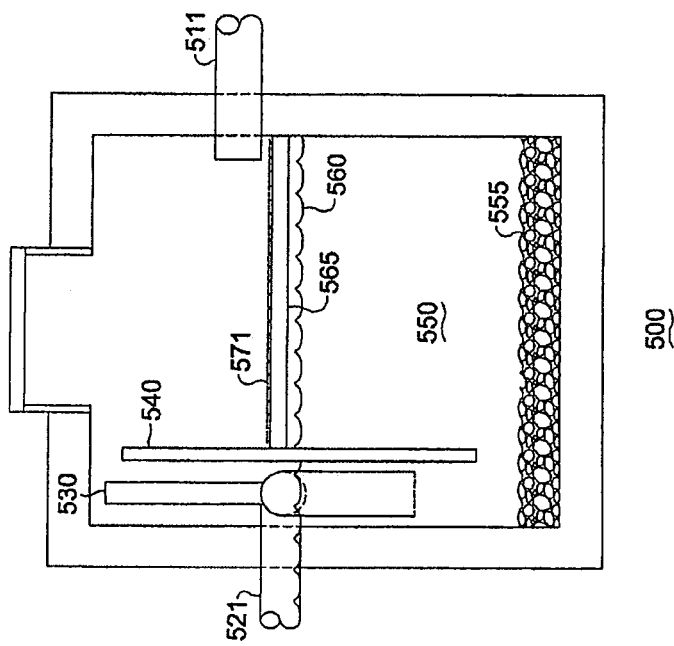
FIG. 5 is a diagram of a fluid treatment unit according to another embodiment of the invention.

FIG. 5 illustrates a front view of a fluid treatment unit 500 according to an embodiment of the invention.

Fluid treatment unit 500 comprises chamber 550, with openings for inlet 511 and outlet 521. Inlet 511 and outlet 521 are separated by wall 540 extending only part way between the top and bottom of chamber 550. The inlet fluid from inlet 511 is pre-separated by wire mesh 571 for larger debris. Vent pipe 530 is located on top of outlet 521 to facilitate the release of any pressure differential in outlet 521. In operation, fluid flowing through unit 500 is separated by density. Lighter components 565 float on top of the reservoir of principal fluid in chamber 550. Heavier components 555 settle and are collected at the bottom of chamber 550. Once the level of fluid 560 in chamber 550 reaches the lower level of pipe 521, processed fluid flows out of pipe 521.

Figure 6:
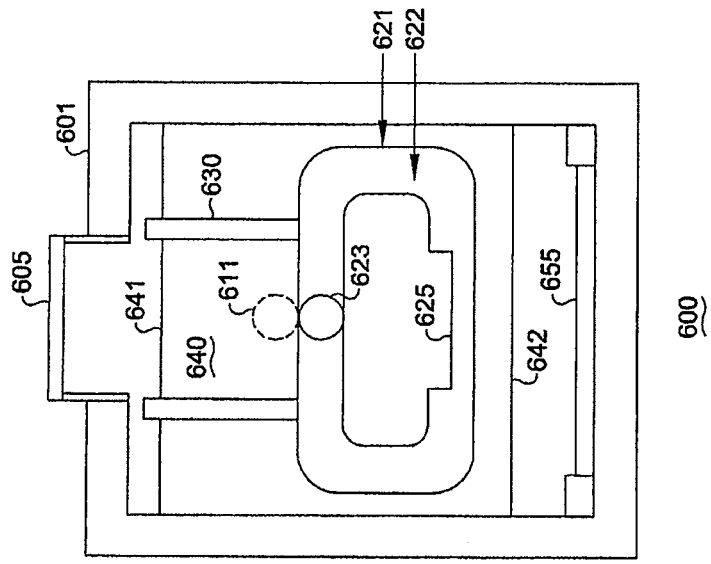
FIG. 6 is a diagram of a fluid treatment unit with an alternate manifold according to another embodiment of the invention.
Figure 7:
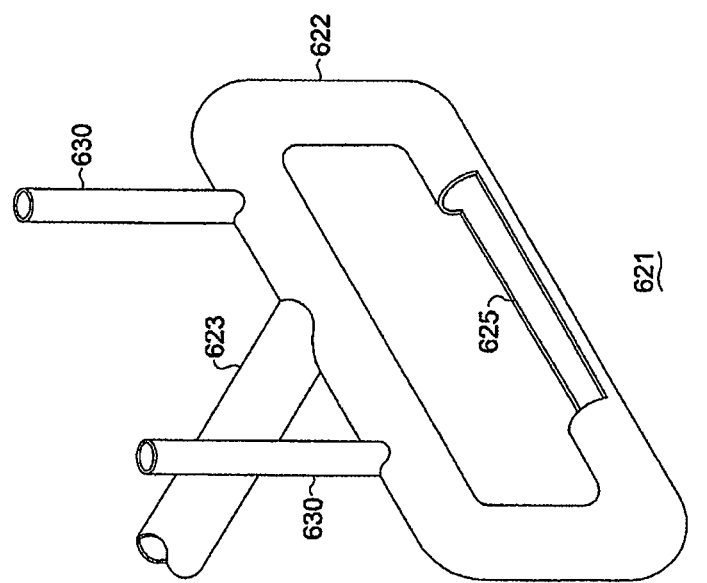
FIG. 7 is a diagram of an alternate manifold for a fluid treatment unit according to an embodiment of the invention.

FIG. 6 illustrates a side view of a fluid treatment unit 600 with an alternate outlet manifold 621 according to another embodiment of the invention. FIG. 7 illustrates a perspective view of alternate outlet manifold 621 according to an embodiment of the invention.

Fluid treatment unit 600 comprises a chamber defined by wall 601, sump area 655 for collecting debris at the bottom of the chamber, and access opening 605 at the top of the chamber. Inlet pipe 611 is located on one side of the chamber, and outlet manifold 621 with an outlet pipe 623 is located on another side of the chamber. Inlet pipe 611 and outlet pipe 623 are separated by a wall 640 in the chamber having a wall top 641 and a wall bottom 642.

A space exists between wall top 641 and the top of the chamber to allow airflow between the chamber and vent pipes 630. Another space exists between wall bottom 642 and the bottom of the chamber to allow fluid to flow from inlet pipe 611 to outlet manifold 621. Outlet manifold 621 comprises pipe loop 622 and vent pipes 630 and is connected to outlet pipe 623. Pipe loop 622 has a cut-out 625 at the top surface of a bottom portion of the loop.

In a preferred mode of operation, fluid flows into the chamber from inlet pipe 611 into a pool of fluid in the chamber normally at a level reaching the bottom surface of outlet pipe 623. Fluid in the pool flows underneath wall bottom 642 and enters outlet manifold 621 through cut-out 625, which is positioned lower than outlet pipe 623. Fluid that entered outlet manifold 621 through cut-out 625 rises in pipe loop 622 as the fluid level in the chamber rises, until it reaches the level of the bottom surface of outlet pipe 623 and flows out through outlet pipe 623. Only fluid entering outlet manifold 621 through cut-out 625 will be able to access outlet pipe 623. Outlet pipe 623 is positioned lower than inlet pipe 611 so that fluid can flow due to gravity from inlet pipe 611, through the chamber, into the outlet manifold 621 via cut-out 625, and out through outlet pipe 623.

Particles caught in the flow of fluid under wall bottom 642, or swept up from sump area 655, if any, may impact the bottom surface of the bottom portion of pipe loop 622. Such impact can prevent, or at least slow, the flow of such particles into cut-out 625.

Differences in air pressure between the chamber and pipe loop 622 are equalized due to the flow of air over wall top 641 and into vent pipes 630 or from vent pipes 630 over wall top 641 to the chamber.

According to an embodiment of the invention, a method of retrofitting an existing storm water trunk line is disclosed. First, two separated sections of a trunk line are replaced with two chambers, the second chamber separate and downstream from the first chamber. Next, a storm water treatment unit, either as disclosed in the present invention or known in the art, is connected to the two installed chambers via an inlet pipe connected to the first chamber and an outlet pipe connected to the second chamber. A baffle is installed in the first chamber with a height no greater than the top of the inlet pipe in the first chamber to direct flow into the inlet pipe. In another embodiment of the invention, a backflow preventer is installed between the outlet pipe and the second chamber.

A portable water treatment (PWT) system 660 according to an embodiment of the invention appears to benefit from a combination of principles concerning the interaction of particles and liquids in water. The first principle concerns the density of water versus the density of the contaminating particles and of the contaminating liquids. Particles and liquids that have a greater density that than water will tend to sink and particles and liquids that have a lower density will tend to float. The second principle is that particles tend to sediment faster in still water than in fast moving or turbulent water. The third principle is that more particles will tend to sediment out of solution the more time is allowed for sedimentation. The fourth principle is that particles tend to sediment more when they impact a solid surface. The disclosed PWT system 660 is preferably configured to maximize the amount of suspended solids, debris and petroleum products that can be removed from the water before the water is discharged into a riparian system, another body of water, or a storm drain system.

Figure 8:
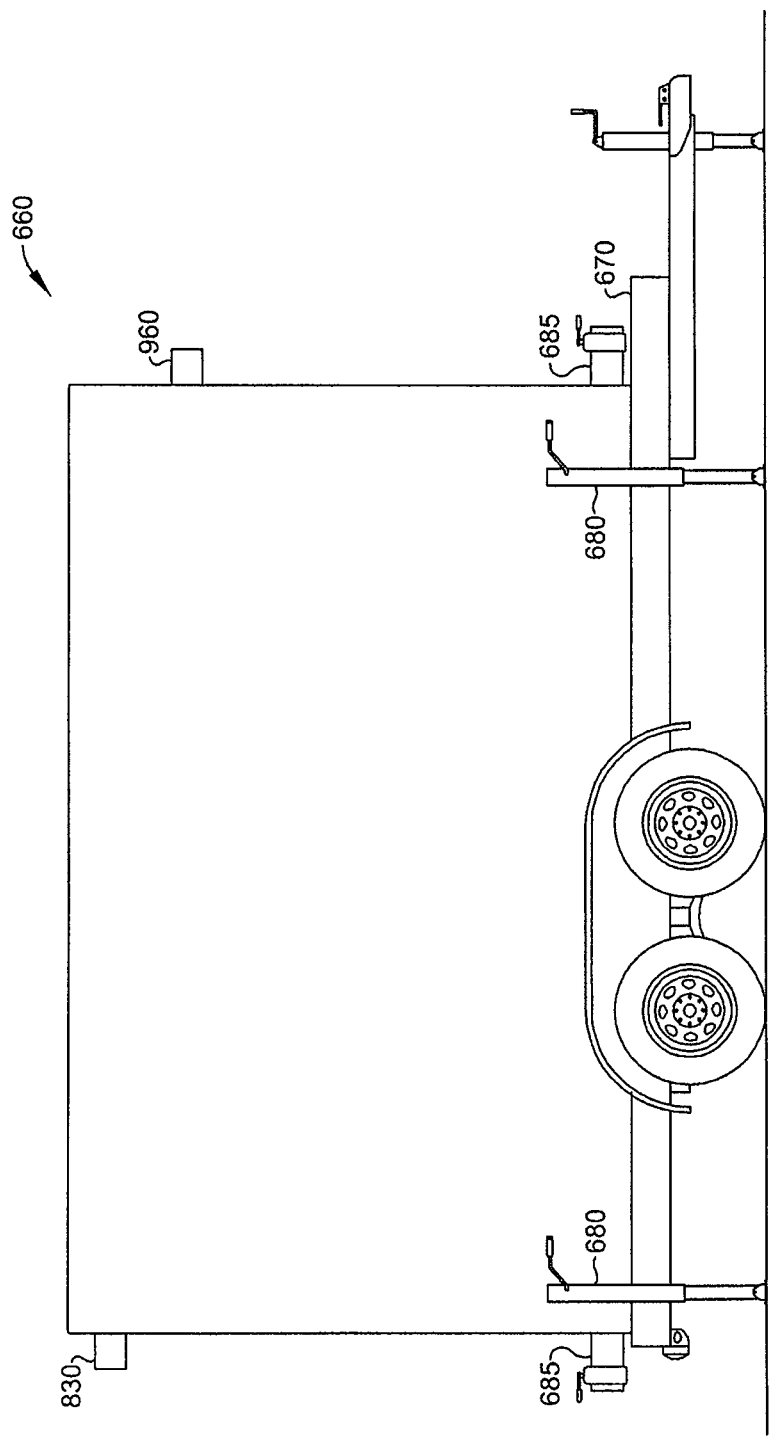
FIG. 8 is a diagram of an exterior side view of a fluid treatment system according to an embodiment of the invention.
Figure 13:
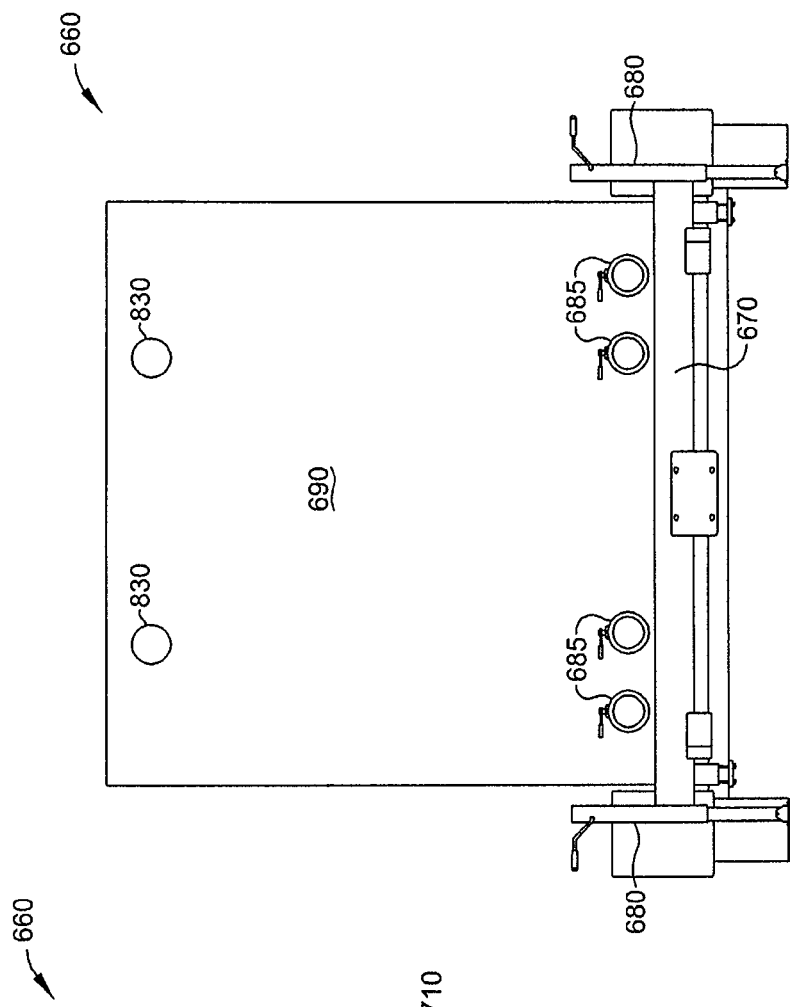
FIG. 13 is a diagram of an exterior view of a rear wall of a fluid treatment system according to an embodiment of the invention.

In FIGS. 8 and 13, a PWT system 660 is shown on a trailer 670 suitable for towing by a truck, tractor, or other suitable vehicle (e.g., a bulldozer). Due to the size of the trailer and the weight of the water during the operation of the PWT system, the trailer has stabilizers or levelers 680 at each corner of the trailer to reduce the weight on the tires and axles of the trailer and to level (or intentionally angle) the top surface of the trailer and the PWT system. Inlet ports 830, outlet ports 960 and drainage ports 685 are also shown. Alternatively, system 660 may be constructed on or as part of a pickup truck, a truck, a truck trailer, a tractor-trailer truck, or other suitable motorized vehicle. PWT system 660 is preferably constructed of metal, such as stainless steel and brass, and, alternatively, it may be constructed from concrete, plastic, fiberglass, wood or any other rigid material appropriate for the purpose, or combinations of any of those materials.

One or more drainage ports 685 are connected to one or more sedimentation units within system 660 to allow for drainage of the units. The front of the PWT system 660 has four drainage ports 685 while the back has two drainage ports 685 (only one shown).

Figure 9:
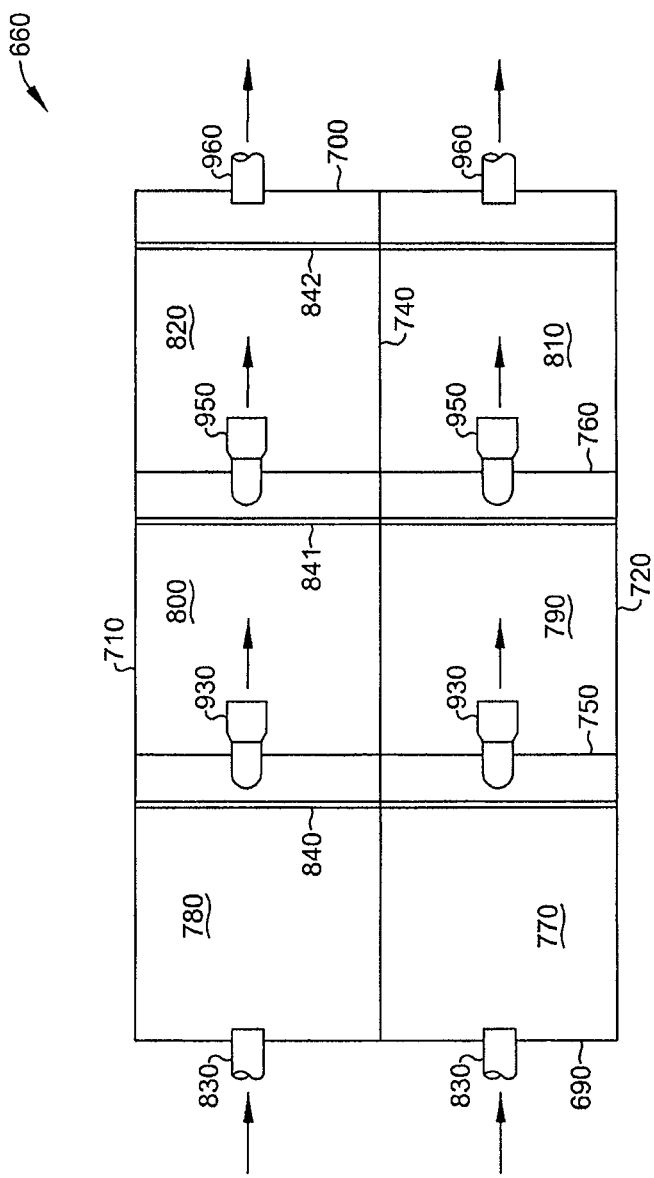
FIG. 9 is a diagram of a partial top view of a fluid treatment system according to an embodiment of the invention.

In FIG. 9, a preferred embodiment of a PWT system 660 is shown in a rectilinear configuration with a front wall 690, back wall 700, left wall 710, right wall 720 and bottom 730 joined together so they are watertight. The front wall 690, back wall 700, left wall 710, right wall 720 and bottom 730 may be flat planar, rounded, or textured. Alternatively, system 660 may be configured as a cylinder, a spherical shape, an irregular hexahedron, or the like or as a variation in between such forms. The interior of the PWT system 660 is preferably configured as a plurality of separate sedimentation units which are similarly constructed. Alternatively, the sedimentation units may be of different shapes and sizes and not symmetric.

Figure 10:
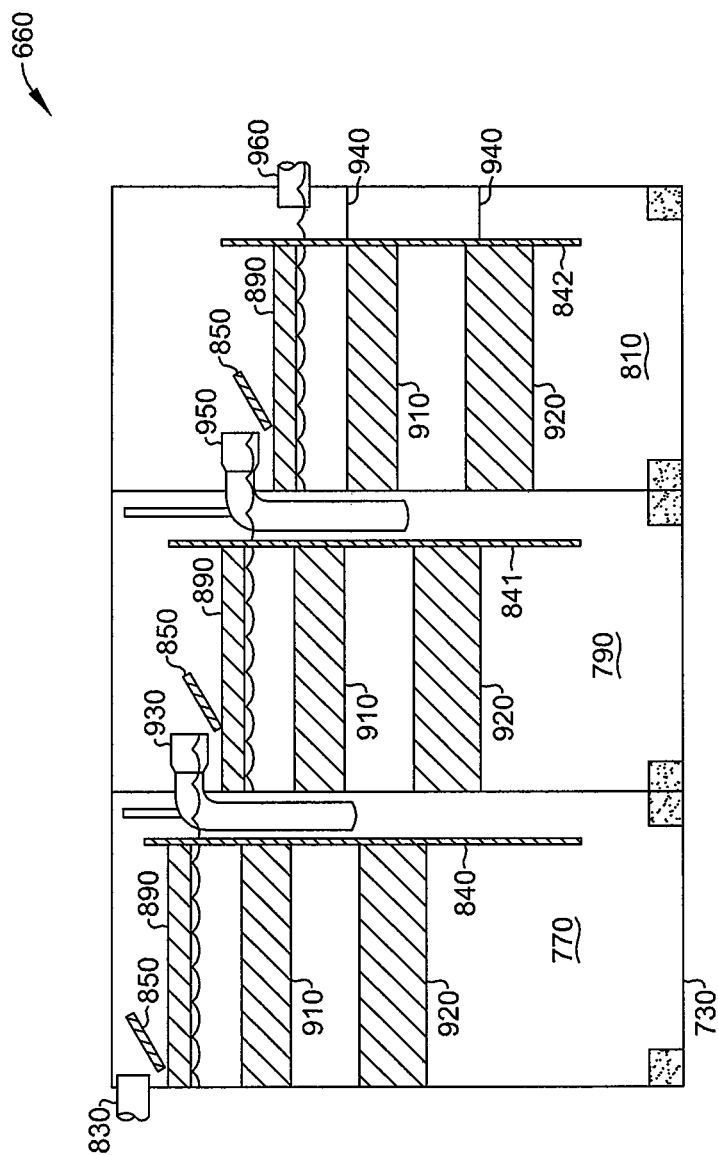
FIG. 10 is a diagram of a cross-sectional view of a fluid treatment system according to an embodiment of the invention.

As shown in FIG. 10, the PWT system 660 has a center divider 740 to form two rows of three connected sedimentation units. In each row, two partitions 750 and 760 parallel to the front wall 690 and back wall 700 separate the three sedimentation units. Those parallel partitions form the respective back or front walls of neighboring sedimentation units. The PWT system shown includes six sedimentation units 770, 780, 790, 800, 810 and 820. Each row of sedimentation units preferably operates independently of the other rows of sedimentation units.

Stabilizers/levelers 680 (not shown in FIG. 9) are used to level PWT system 660 for maximum functionality to allow fluid to flow through the system. Fluid flows into the first set of sedimentation units 770 and 780 via respective inlets 830. Fluid flows under debris wall 840 to outlet pipes 930 and through to the second set of sedimentation units 790 and 800, respectively. The fluid flows under debris wall 841 to outlet pipes 950 and through to the third set of sedimentation units 810 and 820, respectively. The fluid flows under debris wall 842 to outlets 960 for discharge from the system. Debris walls 840 and 841 block floating debris from reaching the respective next sedimentation units. Debris wall 842 blocks floating debris from reaching outlet 960.

PWT system 660 is shown with six sedimentation units arranged in two rows of three sedimentation units each for illustrative purposes and simplicity of describing aspects of the invention. However, a PWT system is not limited to such an arrangement. On or more rows of one or more sedimentation units may be utilized depending on the requirements of the specific task.

For example, if the task involves treating a large volume of water with a very low suspended solids load, then the PWT system could include many rows of units with multiple units per series. This arrangement will allow several water pumps to be used at the same time while the pumping distance and time for removing suspended solids remains mostly the same.

As another example, if the task involves treating a water source with a heavy suspended solid load of flocculent solids, the number of units in a row can be increased to so that the fluid spends more time in the system to allow the solids to settle out. Alternatively, the PWT system may incorporate a larger number of sedimentation units and multiple rows of units may be ganged together in series. For example, a series of flat-bed trailers or tractor-trailer trucks carrying multiple sedimentation units could be connected together. The PWT system is easily scaled to larger sizes. The size of each unit, number of units in a row, and number of rows of units are not limited and can be any amount needed for a particular task.

ment, the left and right rows include sedimentation units of different sizes, in different numbers, or differently configured.

FIG. 10 shows three sedimentation units 770, 790, and 810 of similar construction. Each sedimentation unit includes two sections separated by a respective debris wall 840, 841 and 842. The first section contains horizontal collectors 890, 910, and 920 and comprises the major length of the sedimentation unit. The second section is shorter in length and does not contain collectors. Debris walls 840, 841, and 842 serve as partial barriers to divide the sedimentation units into two sections in fluid communication. Example fluid levels are shown in units 770, 790, and 810 to assist in understanding the invention.

The horizontal collectors 890, 910, and 920 can be of any shape, size or surface configuration. The surfaces of the collectors can be flat, wavy, jagged or the like. In cross section the collector may approximate a sine wave, square wave, or triangular wave, or be angled to one side, slanted towards the water flow, or form an open box with depth or the like. The plurality of collectors may be arranged in a cascading pyramid with the topmost collector having the smallest width or length dimensions of the collectors in the sedimentation unit with each successive collector increasing in width or length dimension until the bottom most collector has the largest width or length dimensions. Alternatively, the collectors in a sedimentation unit may be arranged in an "X" arrangement or zigzag configuration with each collector overlapping the collector below it so there is no direct vertical path for water flow from the surface of the water to the bottom of the unit.

Debris walls 840, 841 and 842 are preferably connected to the left and right sides of the respective sedimentation unit in which each is contained. The top edges of the walls 840, 841 and 842 are higher than the water outlet for their respective units, so the surface of the water in the sedimentation unit is below the top edge, and higher than the top surface of upper collector 890. Large particles or other materials that float are stopped by these walls from passing to the outlet of the unit. Floating material will build up against the wall and remain in the first section of the unit. The top edges of the walls 840, 841 and 842 are shown in FIG. 10 at different distances from the tops of the respective sedimentation units. Alternatively, those top edges may be at the same distance from the tops of the respective sedimentation units or at other different distances.

| | | INCREASING VOLUME OF WATER TO BE TREATED ROWS | | | | | | | | | | |
|---|---|---|---|---|---|---|---|---|---|---|---|---|
| | | 1 | 2 | 3 | 4 | 5 | 6 | 7 | 8 | 9 | 10 | ∞ |
| INCREASING | UNITS 1 | 1:1 | 2:1 | 3:1 | 4:1 | 5:1 | 6:1 | 7:1 | 8:1 | 9:1 | 10:1 | ∞:1 |
| AMOUNT OF | 2 | 1:2 | 2:2 | 3:2 | 4:2 | 5:2 | 6:2 | 7:2 | 8:2 | 9:2 | 10:2 | ∞:2 |
| SUSPENDED | 3 | 1:3 | 2:3 | 3:3 | 4:3 | 5:3 | 6:3 | 7:3 | 8:3 | 9:3 | 10:3 | ∞:3 |
| SOLIDS | 4 | 1:4 | 2:4 | 3:4 | 4:4 | 5:4 | 6:4 | 7:4 | 8:4 | 9:4 | 10:4 | ∞:4 |
| | 5 | 1:5 | 2:5 | 3:5 | 4:5 | 5:5 | 6:5 | 7:5 | 8:5 | 9:5 | 10:5 | ∞:5 |
| | 6 | 1:6 | 2:6 | 3:6 | 4:6 | 5:6 | 6:6 | 7:6 | 8:6 | 9:6 | 10:6 | ∞:6 |
| | 7 | 1:7 | 2:7 | 3:7 | 4:7 | 5:7 | 6:7 | 7:7 | 8:7 | 9:7 | 10:7 | ∞:7 |
| | 8 | 1:8 | 2:8 | 3:8 | 4:8 | 5:8 | 6:8 | 7:8 | 8:8 | 9:8 | 10:8 | ∞:8 |
| | 9 | 1:9 | 2:9 | 3:9 | 4:9 | 5:9 | 6:9 | 7:9 | 8:9 | 9:9 | 10:9 | ∞:9 |
| | 10 | 1:10 | 2:10 | 3:10 | 4:10 | 5:10 | 6:10 | 7:10 | 8:10 | 9:10 | 10:10 | ∞:10 |
| | ∞ | 1:∞ | 2:∞ | 3:∞ | 4:∞ | 5:∞ | 6:∞ | 7:∞ | 8:∞ | 9:∞ | 10:∞ | ∞:∞ |

The right-hand row of sedimentation units shown in FIG. 9 will be described to illustrate the treatment of the water in connection with FIG. 10. The left-hand row is structured and functions in a corresponding manner. In an alternate embodi- The bottom edges of the walls 840, 841, and 842 extend toward but remain above the bottom of the respective sedimentation unit to allow water flow from the first section into the respective second section by passing underneath the bottom edge. The bottom edge of each of the walls are preferably the same distance from the bottom 730. Alternatively, the bottom edges of the respective walls may be at different distances from the bottom 730.

In sedimentation units 770 and 790, a circular pipe arrangement 621 (shown in FIG. 7) hangs down into the water collected in the second section of the respective unit. The top of the circular pipe includes two vertical pipes 630 extending above the water surface and are open to the air. This prevents the creation of a siphon effect within the circular pipe arrangement 621 that pulls water (and sediment) out of either unit. At the bottom of the circular pipe arrangement 621 is a cut-out 625 to allow the entry of water. The water from this cut-out 625 goes up either side of the circular pipe arrangement 621 to enter the next sedimentation unit through discharge pipe 623.

Figure 15:
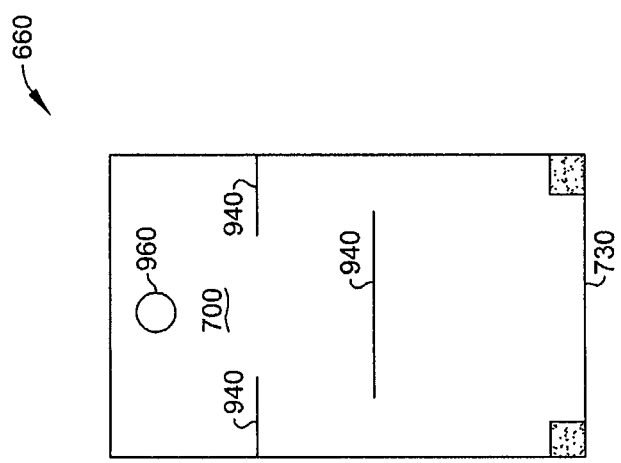
FIG. 15 is a cross-sectional view between the debris wall and the back wall of a fluid treatment unit according to an embodiment of the invention

As shown in FIG. 10, for sedimentation unit 770, the discharge pipe 623 of pipe arrangement 621 is connected to outlet pipe 930. For sedimentation unit 790, the discharge pipe 623 is connected to outlet pipe 950. For sedimentation unit 810, shelves 940 extend between the barrier and the rear wall to interrupt the flow of water. The shelves define a circuitous path to the outlet 960 to promote the settlement of the suspended solids as shown in FIG. 15. Alternatively, shelves 940 could be replaced with a circular pipe arrangement 621 as in units 770 and 790 or the pipe arrangements 621 in units 770 and/or 790 could be replaced with shelves 940. As further alternatives, a combination of circular pipe arrangements, downward extending pipes with vents, and/or shelves could be implemented in the second section of one or more of units 770, 790, and 810.

As shown in FIG. 10, it is preferable for the collectors, debris wall, and outlet pipe for each unit to be lower relative to its predecessor unit to allow for the natural flow of water through the system due to gravity and the equalization of the water level on both sides of the debris wall in the unit.

In general, inlet water flows through inlet 830, through unit 770 around collectors 890, 910, and 920 and under wall 840 to the outlet pipe arrangement and through outlet pipe 930 to unit 790. In a corresponding manner, inlet water from unit 770 flows through unit 790 to unit 810. Inlet water from unit 810 flows through outlet 950, through unit 810 around collectors 890, 910, and 920 and under wall 840, around shelves 940 and through outlet 960. The inlet and outlet pipes are sized as appropriate for the volume and flow rate of fluid expected.

More specifically, untreated water enters PWT system 660 through the inlet 830 at the front of the first sedimentation unit 770. Upon entering the sedimentation unit 770, the untreated water preferably strikes deflector shield 850 causing the flow of water to spread and decelerate. Deflector shield 850 is preferably made of metal and configured to divert the flow of water across much of upper collector 890. Optionally, deflector shield 850 is omitted.

After the inlet water hits upper collector 890, its velocity decreases and its direction changes. The water cascades down from upper collector 890 to middle collectors 910 and then to lower collector 920. When the sedimentation unit is filled with fluid to the level of outlet pipe 930, the inlet untreated water flows into the collected pool of water and around the plurality of collectors along much the same path. Preferably, sediment from the inlet water collects in each of collectors 890, 910, and 920 and at the bottom 730 of unit 770. Water with less sediment than the inlet water passes under wall 840 to the circular pipe arrangement and leaves the unit via outlet 930.

The flow of inlet water in unit 790 follows the same path as described for unit 790.

In unit 810, the flow of water is slightly different. Water passing through outlet 950 preferably strikes deflector shield 850 causing the flow of water to spread and decelerate. Optionally, deflector shield 850 is omitted.

After the inlet water hits upper collector 890, its velocity decreases and its direction changes. The water cascades down from upper collector 890 to middle collectors 910 and then to lower collector 920. When the sedimentation unit is filled with fluid to the level of outlet pipe 960, the inlet untreated water flows into the collected pool of water and around the plurality of collectors along much the same path. Preferably, sediment from the inlet water collects in each of collectors 890, 910, and 920 and at the bottom 730 of unit 810. Water with less sediment than the inlet water passes under wall 842, around one or more shelves 940, and leaves the unit via outlet 960.

After the water has passed through the three sedimentation units, it exits through outlet 960. The water from outlet 960 contains less solids the original inlet water and may suitable for discharge into a storm drainage system, riparian system or other body of water. The suspended solids treatment system can have many different configurations depending on the amount of water to be treated, the amount of sediment in the water, and the quality of the water needed at the end of the treatment.

As shown in FIG. 11, PWT system 660 preferably includes removable covers 970, 971 and 972. Each of the covers includes handles or lift points 973. Covers 970, 971, and 972 are sized to cover pairs of units 770 and 780, 790 and 800, and 810 and 820, respectively. The covers reduce the potential for airborne contamination from entering the system and allow access for cleaning out the units. Additionally, the covers add structural support to system 660 during transportation.

Figure 12:
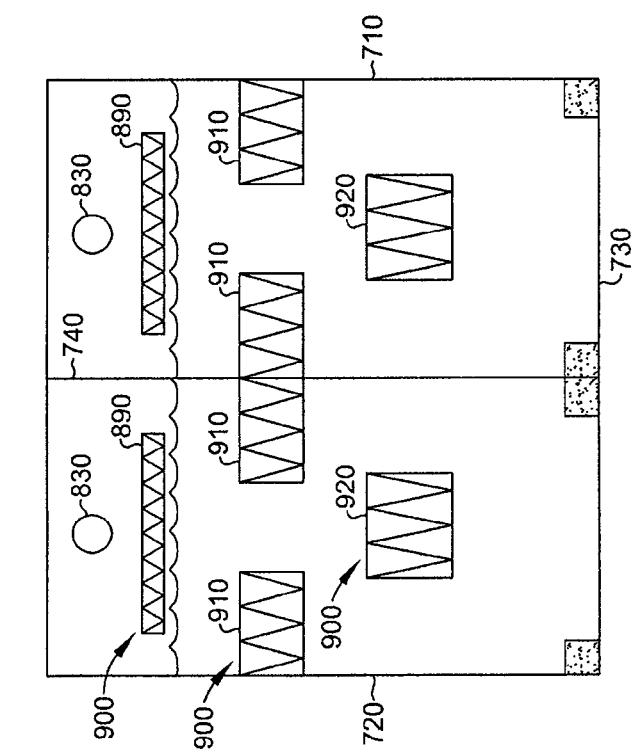
FIG. 12 is a diagram of a cross-sectional view parallel to the front wall of a fluid treatment system according to an embodiment of the invention.

In FIG. 12, a cross-sectional view of units 770 and 780 is shown without velocity reduction shields 850. Untreated water first hits upper collector 890 which collects high density solids that immediately fall out of solution. Preferably, upper collector 890, middle collectors 910 and lower collector 920 each has an undulating surface 900 to trap sediment and produce a dead zone of water movement to assist in the sedimentation of suspended solids in the inlet water. The suspended solids collect in the collectors and at the bottom 730 of each unit.

The water spills over the left and right edges of upper collector 890 to flow into the left and right middle collectors 910. These collectors collect the slightly less dense suspended solids and any denser sediment that may spill over from the upper collector.

The water flows over the middle collectors 910 and then down to the lower collector 920 located below and generally between the middle collectors. After the water flows into the lower collector 920, it can flow either left or right over the lower collector to the bottom of the sedimentation unit. The number of collectors in a sedimentation unit can be increased or decreased as appropriate for the specific task.

Figure 14:
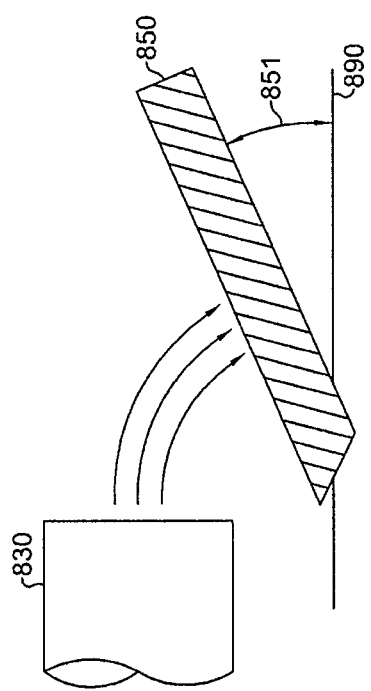
FIG. 14 is a diagram of a velocity reduction shield according to an embodiment of the invention.

FIG. 14 shows an optional velocity reduction shield 850 which may be oriented at an angle 851 relative to upper collector 890. Shield 850 is preferably arranged to reduce the velocity and force of the incoming water from an inlet pipe, such as inlet 830 as shown. Shield 850 also is preferably configured to spread the inlet water across a greater area of upper collector 890 and reduce the amount of sediment that is washed out of collector 890. By reducing the velocity of and redirecting the inlet water, it will impact collector 890 with less force.

Optionally, outlet pipes 930, 950, and/or 960 may include a weir to collect additional particles. As shown in FIGS. 16A and 16B and explained with reference to outlet pipe 930, the outlet pipe 930 may comprise an original diameter pipe 931 and a larger diameter pipe 932 with a weir 935. Preferably, weir 935 is comprised of metal wire or other sturdy structure to collect particles. The increase in diameter between pipes 931 and 932 reduces the restriction of flow caused by the weir.

It is desirable to size the PWT system 660 and its components to allow sufficient water flow to avoid the back-up of fluid any unit to cause an overflow. The pipes 830, 930, 950 and 960 are preferably sized to allow the water to flow at substantially equivalent rates. For example, in a preferred embodiment, all four pipes 830, 930, 950 and 960 are three inches in diameter. In another embodiment, pipes 830 and 960 are 3 inches in diameter while pipes 950 and 960 are 4 inches in diameter and include weirs. The flow rate of the water with suspended solids into a row of sedimentation units may be up to 50 gallons/minute, preferably up to 100 gallons/minute, and more preferably up to 150 gallons/minute. Still larger configurations of the present invention could accommodate flow rates in excess of 150 gallons/minute.

Each collector has a preferably undulating surface to increase the surface area for sedimentation, produce dead zones of reduced water movement, and to separate sediment from the flowing water. In FIGS. 17A, 17B, 17C, 18A, 18B, 18C, 19A, 19B, and 19C the collectors are shown with a sawtooth surface configuration for illustration purposes. Other shapes and cross-sectional shapes may be used, including more random patterns. Additionally, the undulations can be parallel, perpendicular or askew of the water flow. The collectors in each sedimentation unit are preferably removable for cleaning.

Figure 17C:
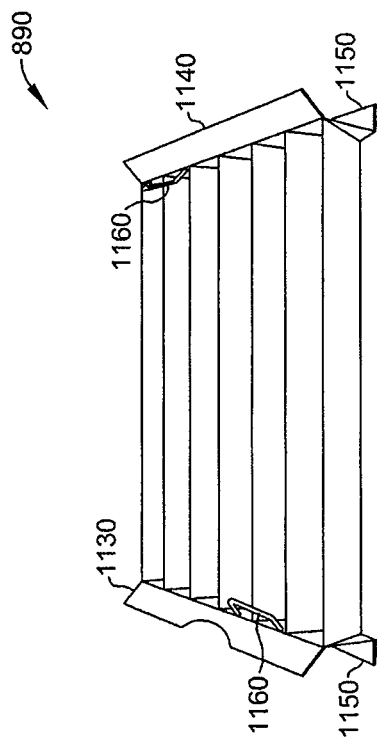
FIG. 17C is a diagram of a perspective view of an upper collector according to an embodiment of the invention.
Figure 17A:
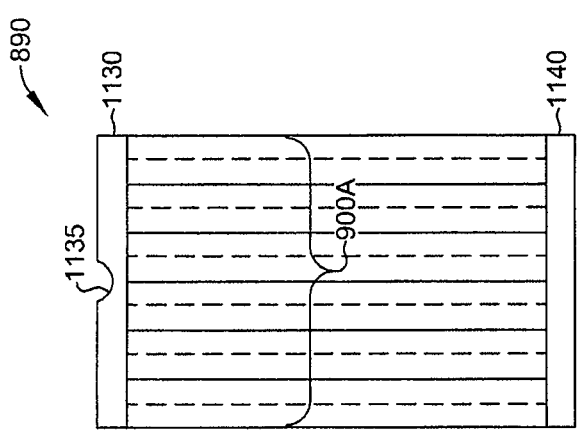
FIG. 17A is a diagram of an upper collector according to an embodiment of the invention.
Figure 17B:
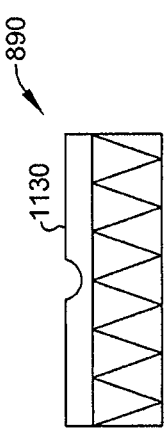
FIG. 17B is a diagram of a cross-sectional view of an upper collector according to an embodiment of the invention.

In FIGS. 17A, 17B and 17C the upper collector 890 has flanges 1130 and 1140 along front and rear top edges, respectively, and an undulating surface 900A. Flange 1130 stops water flow between the front edge of the collector and the front wall of the unit. Flange 1140 stops water flow between the rear edge of the collector and the debris wall of the unit. Preferably, water should flow into the upper collector and then cascade over the left and right edges of the collector so it hits the middle collectors 910 below it. The front flange 1130 has a cut-out 1135 to accommodate inlet pipe 830. Along the bottom of upper collector 890 at the front and rear edges are ledges 1150 and 1160 for contact with or connection to the respective front and debris walls of the unit.

Within the depth produced by the sides and bottom of collector 890 is an undulating surface 900A. The depth of the collector and number of undulations within the collector are not limited, and are simply a design choice for a particular task. Handles or attachment points 1160 are optionally provided to facilitate removal of the collector from a sedimentation unit during cleaning.

Figure 18C:
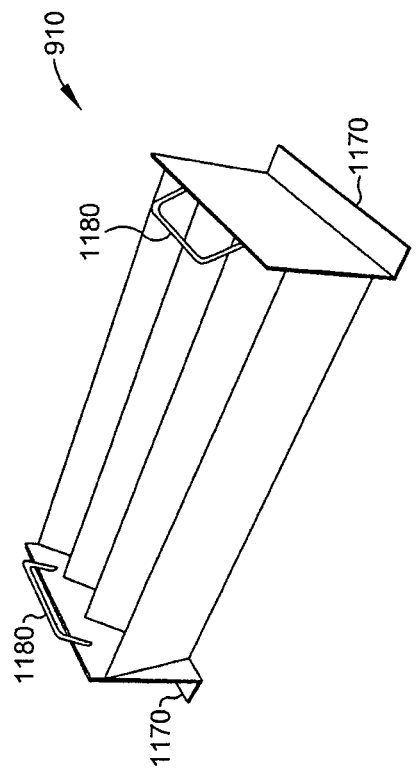
FIG. 18C is a diagram of a perspective view of a middle collector according to an embodiment of the invention.
Figure 18A:
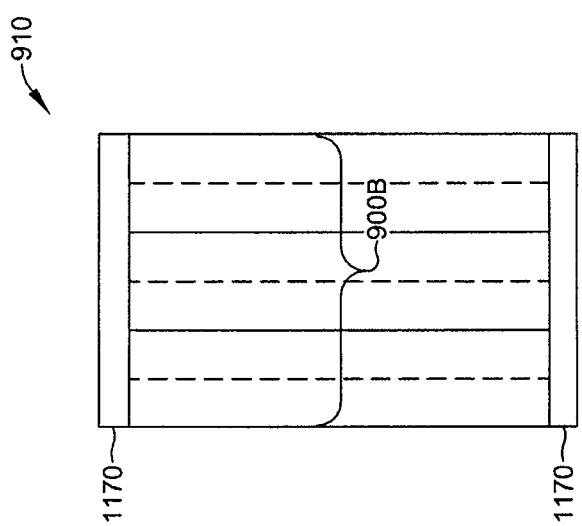
FIG. 18A is a diagram of a middle collector according to an embodiment of the invention.
Figure 18B:
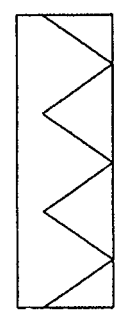
FIG. 18B is a diagram of a cross-sectional view of a middle collector according to an embodiment of the invention.

In FIGS. 18A, 18B and 18C the middle collector 910 has an undulating surface 900B between two opposing front and back walls. Along the bottom of middle collector 910 at the front and rear edges are ledges 1170 for contact with or connection to the respective front and debris walls of the unit. Preferably, water should flow into the middle collector and then cascade over either the left or right edge so it hits the lower collector 920 below it.

Within the depth produced by the sides and bottom of collector 910 is an undulating surface 900B. The depth of the collector and number of undulations within the collector are not limited, and are simply a design choice for a particular task. Handles or attachment points 1180 are optionally provided to facilitate removal of the collector from a sedimentation unit during cleaning.

Figure 19C:
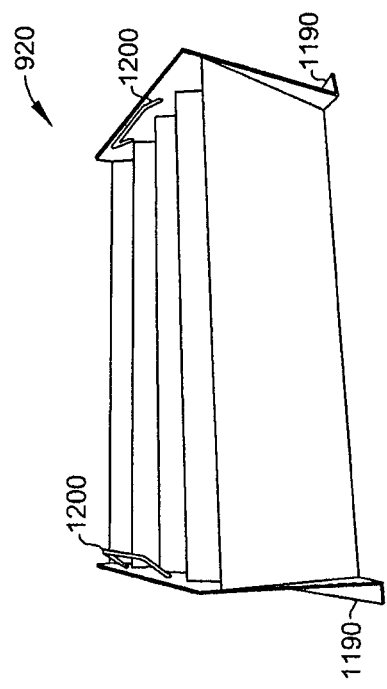
FIG. 19C is a diagram of a perspective view of a lower collector according to an embodiment of the invention.
Figure 19A:
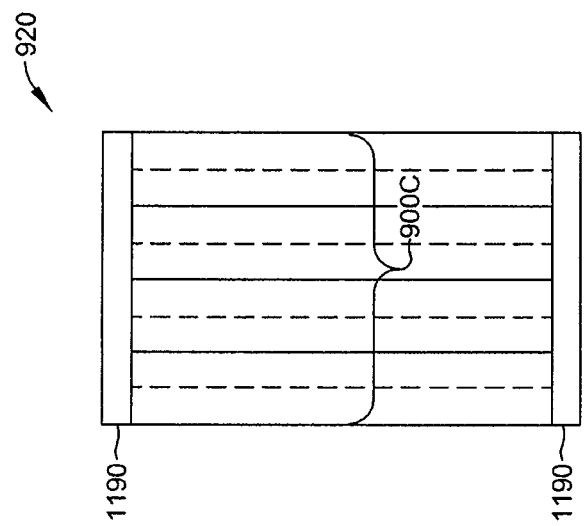
FIG. 19A is a diagram of a lower collector according to an embodiment of the invention.
Figure 19B:
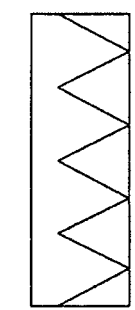
FIG. 19B is a diagram of a cross-sectional view of a lower collector according to an embodiment of the invention.

In FIGS. 19A, 19B and 19C the lower collector 920 has an undulating surface 900C between two opposing front and back walls. Along the bottom of lower collector 920 at the front and rear edges are ledges 1190 for contact with or connection to the respective front and debris walls of the unit. Preferably, water should flow into the lower collector and then cascade over both the left and right edge.

Within the depth produced by the sides and bottom of collector 920 is an undulating surface 900C. The depth of the collector and number of undulations within the collector are not limited, and are simply a design choice for a particular task. Handles or attachment points 1200 are optionally provided to facilitate removal of the collector from a sedimentation unit during cleaning.

As shown in the Figures, it is preferably that the number of undulations in surfaces 900A, 900B, and 900C progressively decreases while the depth of the undulations progressively increases. The collectors are shown with increasing depth of undulations from top to bottom as arranged in a sedimentation unit. Alternatively, the size, shape and depth of undulations could be reversed in order or otherwise vary among the upper, middle, and lower collectors or within each collector itself. A greater or lesser number of levels of collectors could be used in a sedimentation unit allowing the unit to be shorter or taller if desired as well.

Examples of use of a PWT system according to an embodiment of the invention will be discussed.

Example 1

An active construction site is hit with a heavy rain storm that produces a run off with 22,000 mg/l of suspended solids. A treatment system with three sedimentation units with internal dimensions of 1.5 m by 1.5 m by 1 m each is used to treat the water collecting at the construction site. The treatment system is considered full when the capacity of the first sedimentation unit is half full of solids, the second sedimentation unit is half full of solids and the third sedimentation unit is one quarter full of solids. The capacity of each such sedimentation unit is approximately 1.6 m$^3$, so the capacity of the system before needing cleaning is approximately 2 m$^3$.

A flow rate of 225 l/min off the construction site will result in the system needing cleaning after 11 hours of continuous use.

Example 2

An active construction site is hit with a rain storm that produces a run off with 2,000 mg/l of suspended solids. The treatment system in Example 1 would need cleaning after 127 hours of continuous use.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A portable fluid treatment apparatus for treating an inlet fluid, comprising:
   a container connected to an inlet pipe and to an outlet pipe wherein said outlet pipe is at a position lower in said container than said inlet pipe;
   a wall within said container between said inlet pipe and said outlet pipe;

wherein said wall defines a top space between a top of said wall and a top of said container;

wherein said wall defines a bottom space between a bottom of said wall and a bottom interior surface of said container;

wherein said wall defines a first interior section of said container on an inlet side of said container; and wherein said wall defines a second interior section of said container on an outlet side of said container;

a collector in said first interior section at a level lower than said inlet pipe;

a drain pipe extending downward inside said container from said outlet pipe; and a vent pipe extending upward from said outlet pipe, wherein said collector comprises a sawtoothed cross-section.

2. The portable fluid treatment apparatus of claim 1 wherein said collector comprises a plurality of collectors.

3. The portable fluid treatment apparatus of claim 2 wherein said plurality of collectors are arranged to cascade inlet fluid from one collector to another lower collector.

4. The portable fluid treatment apparatus of claim 1 further comprising a deflector shield between said inlet pipe and said collector.

5. The portable fluid treatment apparatus of claim 1 further comprising wheels for transporting said apparatus.

6. The portable fluid treatment apparatus of claim 1 further comprising a trailer with wheels.

7. The portable fluid treatment apparatus of claim 1 comprising a plurality of said containers with similar internal structures.

8. The portable fluid treatment apparatus of claim 1 wherein said outlet pipe comprises a weir.

9. A portable fluid treatment apparatus for treating an inlet fluid containing suspended solids comprising:

a tank having a front, a back, a right side, a left side, a bottom and a removable top;

wherein said tank comprises a plurality of sedimentation units;

wherein each of the sedimentation units comprises:

a container connected to an inlet pipe and to an outlet pipe wherein said outlet pipe is at a position lower in said container than said inlet pipe;

a wall within said container between said inlet pipe and said outlet pipe;

wherein said wall defines a top space between a top of said wall and a top of said container;

wherein said wall defines a bottom space between a bottom of said wall and a bottom interior surface of said container;

wherein said wall defines a first interior section of said container on an inlet side of said container; and wherein said wall defines a second interior section of said container on an outlet side of said container;

a collector in said first interior section at a level lower than said inlet pipe;

a drain pipe extending downward inside said container from said outlet pipe; and a vent pipe extending upward from said outlet pipe, wherein said collector comprises a sawtoothed cross-section.

10. The portable fluid treatment apparatus of claim 9, wherein said plurality of sedimentation units are connected in series.

11. The portable fluid treatment apparatus of claim 9, wherein said plurality of sedimentation units are connected in parallel.

12. The portable fluid treatment apparatus of claim 9, wherein said plurality of sedimentation units are arranged in a plurality of parallel rows wherein each of the rows contains sedimentation units connected in series.

13. A method of treating inlet water mixed with solids comprises the steps of:

directing the inlet water into an inlet of a treatment unit;

deflecting the inlet water to spread across a horizontal collector;

collecting solids in said horizontal collector;

blocking the horizontal flow of inlet water with an internal wall inside the treatment unit at a level of said inlet; and flowing the inlet water underneath said internal wall and up into an outlet pipe below said level of said inlet, wherein said horizontal collector comprises a sawtoothed cross-section.

14. The method of claim 13 further comprising the step of discharging treated water to a natural body of water or a drainage system.

15. The method of claim 13 further comprising the step of flowing the inlet water through said outlet pipe into an inlet of a second treatment unit.

\* \* \* \* \*